(12) United States Patent
Ibaraki et al.

(10) Patent No.: US 6,665,645 B1
(45) Date of Patent: Dec. 16, 2003

(54) SPEECH RECOGNITION APPARATUS FOR AV EQUIPMENT

(75) Inventors: Satoru Ibaraki, Higashiosaka (JP); Takeo Kanamori, Hirakata (JP); Takashi Kawamura, Osaka (JP); Mikio Oda, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 545 days.

(21) Appl. No.: 09/627,071

(22) Filed: Jul. 27, 2000

(30) Foreign Application Priority Data

Jul. 28, 1999 (JP) ............................................ 11-213276

(51) Int. Cl.7 .......................... G10L 11/02; G10L 15/20
(52) U.S. Cl. ........................ 704/275; 704/226; 704/233
(58) Field of Search ................................ 704/233, 275, 704/226–228, 270; 379/406.13

(56) References Cited

U.S. PATENT DOCUMENTS

| | | | |
|---|---|---|---|
| 5,475,791 A | * 12/1995 | Schalk et al. | 704/233 |
| 5,765,130 A | * 6/1998 | Nguyen | 704/233 |
| 5,848,151 A | * 12/1998 | Boudy et al. | 379/406.13 |
| 5,864,804 A | * 1/1999 | Kalveram | 704/233 |
| 5,920,834 A | * 7/1999 | Sih et al. | 704/233 |
| 6,411,928 B2 | * 6/2002 | Tsurufuji et al. | 704/233 |

FOREIGN PATENT DOCUMENTS

| | | |
|---|---|---|
| JP | 5-22779 | 1/1993 |
| JP | 95-0207 | 4/1995 |

* cited by examiner

Primary Examiner—David D. Knepper
(74) Attorney, Agent, or Firm—Wenderoth, Lind & Ponack, L.L.P.

(57) ABSTRACT

A low-cost speech recognition apparatus for AV equipment capable of speech recognition with high accuracy while 2-channel sound is being produced from loudspeakers is achieved. A monaural conversion part converts 2-channel signals to be inputted to the loudspeakers into a monaural signal. A single echo canceller is provided with an output from a microphone and an output from the monaural conversion part (monaural signal). The echo canceller estimates an echo of multichannel sound based on the monaural signal, and then eliminates the echo sound from the microphone output. Thus, with only a single echo canceller, speech recognition can be carried out while 2-channel sound is being produced from the loudspeakers. Moreover, unlike the case where two echo cancellers are provided, the present invention can prevent the occurrence of mutual interference between the echo cancellers that leads to deterioration in speech recognition performance.

15 Claims, 23 Drawing Sheets

F I G. 1
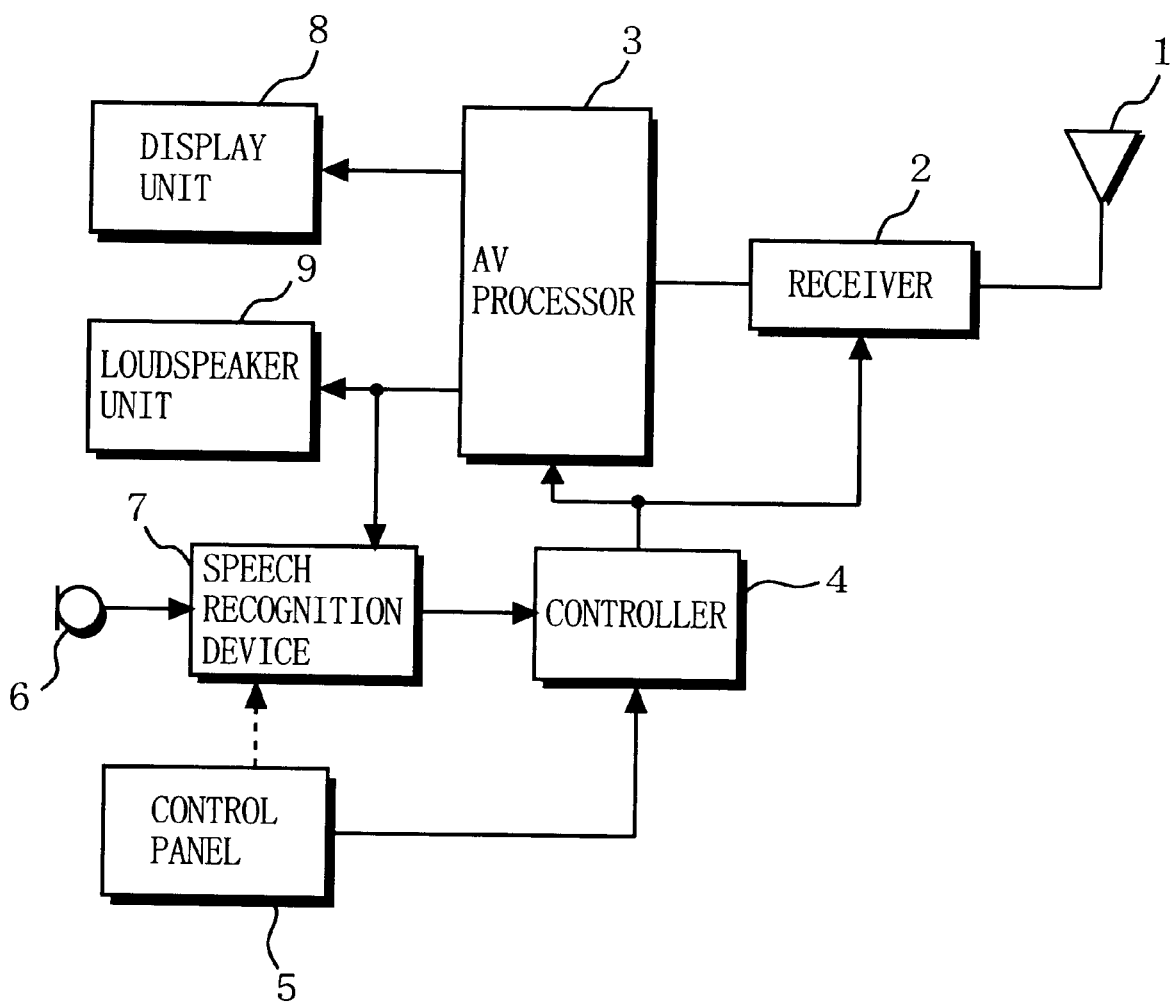

SPEECH RECOGNITION APPARATUS FOR AV EQUIPMENT

BACKGROUND OF THE INVENTION

1. Field of the Invention

The present invention relates to speech recognition apparatuses, and more specifically, to a speech recognition apparatus used for AV equipment such as a TV, radio, and audio system that reproduces multichannel audio including two-channel stereo, capable of controlling the AV equipment through voice, inputting information to the AV equipment through voice, and carrying out other operations even if audio is reinforced by loudspeakers.

2. Description of the Background Art

A conventional speech recognition technique with audio reinforced by a loudspeaker is exemplarily disclosed in Japanese Patent Laid-Open Publication No. 5-22779 (1993-22779) (Title: SPEECH RECOGNITION REMOTE CONTROLLER).

FIG. 23 is a block diagram showing the configuration of a conventional speech recognition apparatus for AV equipment using the technique disclosed in the above publication. The speech recognition apparatus of FIG. 23 is used for AV equipment with a single loudspeaker 201. In FIG. 23, the conventional speech recognition apparatus includes a microphone 202, a speech recognition unit 203, and an echo canceller 204.

With reference to FIG. 24, the operation of the above-configured conventional speech recognition apparatus for AV equipment is now described.

FIG. 24 is a diagram showing time waveforms of signals inputted to or outputted from the components of the speech recognition apparatus of FIG. 23. In FIG. 24, consider the case where a user speaks to control speech while audio is reinforced by the loudspeaker 201.

When the user speaks without the audio being reinforced by the loudspeaker 21, a speech signal outputted from the microphone 202 is extremely good in S/N ratio, as indicated by a reference numeral 211 in FIG. 24. When an audio signal 212 for a TV program is inputted to the loudspeaker 201, an echo signal 213 that is similar to the loudspeaker input 212 is mixed into an output from the microphone 202.

Therefore, the microphone 202 outputs a signal with the user's speech 211 and the echo signal 213 mixed therein, as indicated by a reference numeral 214 of FIG. 24. This signal is too low in S/N ratio for recognition of the user's speech. Naturally, with such microphone output 214, sufficient speech recognition results by the speech recognition unit 203 cannot be expected.

Thus, in the speech recognition apparatus of FIG. 23, the echo signal 213 echoed to the microphone 202 from the loudspeaker 201 is estimated by an adaptive digital filter provided in the echo canceller 204. A subtraction circuit in the echo canceller 204 subtracts the estimated echo signal from the microphone output 214 to totally cancel out the echo signal 213, thereby extracting only the user's speech 211.

The echo canceller 204 is provided with the loudspeaker input 212, which is an input signal to the loudspeaker 201. The adaptive digital filter in the echo canceller 204 estimates an echo signal 215 from the waveform of the loudspeaker input 212 and an impulse response from the loudspeaker 201 through the microphone 202 that is stored therein. Then, the subtraction circuit provided in the echo canceller 204 sub-tracts the estimated echo signal 215 from the microphone output 214 to obtain an echo canceller output 216.

As known from the comparison between the echo canceller output 216 and the waveform of the user's speech 211, the speech recognition unit 203 can be expected to carry out correct speech recognition under the action of echo cancellation by the echo canceller 204 even when audio is reinforced by the loudspeaker 201.

However, the audio recognition apparatus of FIG. 23 supports only monaural AV equipment, and cannot be used for multichannel AV equipment using a plurality of loudspeakers.

FIG. 25 is a block diagram showing the configuration of another conventional speech recognition apparatus for AV equipment. The speech recognition apparatus of FIG. 25 is used for 2-channel AV equipment with two loudspeakers 221 and 222.

In this speech recognition apparatus, sound echoed from the loudspeaker 221 to the microphone 223 and sound echoed from the loudspeaker 222 to the microphone 223 are estimated by adaptive digital filters in the echo cancellers 225 and 226. By subtracting the estimated values from the output signal from the microphone, only user's speech can be extracted. Unlike the speech recognition apparatus of FIG. 23, the speech recognition apparatus of FIG. 25 is adaptable to stereo AV equipment.

The speech recognition apparatus of FIG. 25, however, requires as many echo cancellers as audio channels. Therefore, it becomes too costly for use in multichannel AV equipment. Moreover, in such system using a plurality of echo cancellers, mutual interference among the echo cancellers occurs, resulting in major drawbacks such as instability in adaptive operation of each echo canceller, an increase in echo and oscillation due to failure in adaptation.

It is strongly desired that speech recognition apparatuses for AV equipment should carry out speech recognition while reproducing audio through a loudspeaker, support multichannel audio, ensure high reliability, and have a low price.

However, as described above, the conventional speech recognition apparatuses require as many echo cancellers as audio channels. Therefore, they become too costly for use in multichannel AV equipment.

Furthermore, mutual interference among the echo cancellers makes adaptive operation of each echo canceller extremely unstable, thereby causing an increase in echo and oscillation due to failure in adaptation, and as a result, decreasing speech recognition performance.

SUMMARY OF THE INVENTION

Therefore, an object of the present invention is to achieve a low-cost speech recognition apparatus for multichannel AV equipment capable of speech recognition with high accuracy while multichannel sound is being produced from loudspeakers.

The present invention has the following features to solve the problems above.

A first aspect of the present invention is directed to a speech recognition apparatus used for AV equipment outputting multichannel sound through a plurality of loudspeakers, capable of recognizing user's speech inputted through a microphone and causing the AV equipment to perform a predetermined process, the apparatus comprising:

a monaural conversion part for converting multichannel signals to the plurality of loudspeakers into a monaural signal;

a single echo canceller, provided with an output from the microphone (microphone output) and an output from the monaural conversion part (monaural output), for estimating echo sound of the multichannel sound based on the monaural signal and eliminating the echo sound from the microphone output; and a speech recognition part for recognizing the user's speech based on an output from the single echo canceller (echo canceller output).

In the first aspect, the multichannel signals are converted into a monaural signal, which is provided to the single echo canceller. The single echo canceller eliminates echo sound of multichannel sound from the microphone output. Therefore, with only a single echo canceller, speech recognition can be carried out while multichannel sound is produced from the loudspeakers irrespectively of the number of channels. Furthermore, unlike the case where a plurality of echo cancellers are provided, the present invention can prevent mutual interference among the echo cancellers that leads to deterioration in speech recognition performance.

According to a second aspect, in the first aspect, the multichannel signals are provided to the plurality of loudspeakers.

In the second aspect, multichannel sound is produced from the plurality of loudspeakers. Therefore, echo sound cannot be completely cancelled out with the monaural signal. However, if a monaural level of the multichannel signals is closer to 1, echo sound can be cancelled out for the most part. At least part of echo sound can be cancelled out unless the monaural level of the multichannel signals is 0.

Here, the monaural level of the multichannel signals is a ratio of signal components (monaural components) commonly included in all channels to one of the signals. If the signals of all channels have no correlation to each other, the monaural level is "0". If these signals are equal, the monaural level is "1".

According to a third aspect, in the first aspect, the speech recognition apparatus further comprises a switching part for switching between the multichannel signals and the monaural signal to the plurality of loudspeakers.

In the third aspect, multichannel or monaural sound can be selectively produced from the plurality of loudspeakers.

According to a fourth aspect, in the third a speech recognition apparatus further comprises a speech detection part for detecting the user's speech based on the monaural signal and the echo canceller output, wherein the switching part:

inputs the multichannel signals to the plurality of loudspeakers when the speech detection part does not detect the user's speech; and inputs the monaural signal to the plurality of loudspeakers when the speech detection part detects the user's speech.

In the fourth aspect, multichannel sound is produced when speech recognition is not required (user's speech is not detected), while monaural sound is produced when required (detected). Therefore, speech recognition can be carried out with sufficiently high accuracy.

According to a fifth aspect, in the third aspect, the speech recognition apparatus further comprises:

a start instruction part for providing an instruction to start speech recognition operation;

an end instruction part for providing an instruction to end the speech recognition operation; and a state setting part for setting, responsive to the instructions from the start instruction part and the end instruction part, the speech recognition part to an active state or wait state, wherein the switching part:

inputs the multichannel signals to the plurality of loudspeakers when the state setting part sets the speech recognition part to the wait state, and state; and inputs the monaural signal to the plurality of loudspeakers when the state setting part sets the speech recognition part to the active state.

In the fifth aspect, multichannel sound is produced when the speech recognition part is in a wait state (OFF state), while monaural sound is produced when in an active state (ON state). Therefore, speech recognition can be carried out with sufficiently high accuracy.

According to a sixth aspect, in the fifth aspect, the speech recognition apparatus further comprises:

a monaural level determination part for determining a monaural level of the multichannel signals; and an arbitrary level monaural conversion part for converting the multichannel signals at an arbitrary monaural level, wherein:

the monaural conversion part completely converts the multichannel signals; and when the monaural level determined by the monaural level determination part is lower than a predetermined monaural level, the arbitrary level monaural conversion part converts the multichannel signals at the predetermined monaural level.

In the sixth aspect, the monaural level of the multichannel signals is always higher than the predetermined monaural level. Therefore, even if the speech recognition part is in an active state (ON state), speech recognition performance can be achieved with high accuracy and little loss of a sense of stereo. That is, a sense of stereo and high speech recognition performance can be balanced.

According to a seventh aspect, in the fifth aspect, the multichannel signals are signals of three or more channels, the apparatus further comprises a 2-channel conversion part for converting the multichannel signals into 2-channel signals, the monaural conversion part converts the 2-channel signals into a monaural signal, and the switching part switches among the multichannel signals, the 2-channel signals, and the monaural signal for output to the plurality of loudspeakers.

According to an eighth aspect, in the seventh aspect, the speech recognition apparatus further comprises:

a speech detection part for detecting the user's speech based on the monaural signal and the echo canceller output, wherein:

the switching part:

inputs the multichannel signals to the plurality of loudspeakers when the state setting part sets the speech recognition part to the wait, state;

inputs the 2-channel signals to the plurality of loudspeakers when the state setting part sets the speech recognition part to the active state; and inputs the monaural signal to the plurality of loudspeakers when the speech detection part detects the user's speech.

In the eighth aspect, multichannel sound is produced when the speech recognition part in a wait state (OFF state); multichannel sound is produced when in an active state (ON state) but not required to perform sound recognition (user's speech is not detected); and monaural sound is produced when required to perform sound recognition (user's speech is detected). Therefore, speech recognition performance can be achieved with sufficiently high accuracy and little loss of a sense of stereo.

According to a ninth aspect, in the fifth aspect, the speech recognition apparatus further comprises:

a cancellation monitoring part for monitoring, based on the monaural signal and the echo canceller output, whether the echo canceller sufficiently cancels out the echo sound;

a speech detection part for detecting the user's speech based on the monaural signal and the echo canceller output; and an attenuation part for attenuating the multichannel signals, wherein the attenuation part attenuates the multichannel signals when the speech detection part detects the user's speech while the cancellation monitoring part indicates that the echo sound is not sufficiently cancelled out.

In the ninth aspect, when user's speech is detected while echo sound is not sufficiently cancelled out, the level of sound produced from the plurality of loudspeakers is reduced, thereby preventing mixing of echo sound. Consequently, speech recognition performance with echo sound not sufficiently cancelled out can be improved.

According to a tenth aspect, in the fifth aspect, the echo canceller comprises:

an adaptive digital filter for estimating an impulse response on an echo path between the plurality of loudspeakers and the microphone and calculating the echo sound based on the estimated impulse response and the monaural signal; and a subtraction part for subtracting an output from the adaptive digital filter from the microphone output.

In the tenth aspect, echo sound of multichannel sound is eliminated from the microphone output, only the user's speech can be provided to the speech recognition part.

According to an eleventh aspect, in the tenth aspect, the speech recognition apparatus further comprises an adaptation sound generation part for generating monaural adaptation sound for accelerating adaptation of the adaptive digital filter when the switching part switches inputs to the plurality of loudspeakers from the multichannel signals to the monaural signal.

In the eleventh aspect, when inputs to the loudspeakers are switched from the multichannel signals to the monaural signal, monaural adaptation sound is produced from the plurality of loudspeakers. Therefore, even if no sound is produced immediately after switching, the impulse response held by the digital filter can be forcefully adapted to that on an echo path.

According to a twelfth aspect, in the tenth aspect, the speech recognition apparatus further comprises an adaptation control part for controlling an adaptation speed of the adaptive digital filter, wherein the adaptation control part includes a high adaptation speed for monaural and a low adaptation speed for multichannel, selecting the high adaptation speed when the state setting part sets the speech recognition part to the active state and selecting the low adaptation speed when the state setting part sets the speech recognition part to the wait state.

In the twelfth aspect, the adaptation speed of the adaptive digital filter in the echo canceller is controlled to be high when speech recognition part is set in an active state, while low in a wait state. Therefore, appropriate echo cancellation can be achieved for monaural and multichannel sound.

That is, when multichannel sound is produced from the loudspeakers, many stereo components, which are noise for the adaptive digital filter, are present therein. Therefore, with a low adaptation speed, noise-resistance is increased. On the other hand, when monaural sound is produced, no stereo components are present therein. Therefore, with a high adaptation speed, fluctuations in impulse response on the echo path can be followed more.

As a result, an excellent echo canceling effect can be achieved in a wait state, and speech recognition performance immediately after a transition to an active state can be increased.

According to a thirteenth aspect, in the twelfth aspect, the adaptation control part is provided with an identification signal indicating whether the plurality of loudspeakers are provided with the multichannel signals or the monaural signal, and when the identification signal indicates monaural, the adaptation control part selects the high adaptation speed irrespectively of whether the state setting part sets the speech recognition part to the active or wait state.

In the thirteenth aspect, it is determined whether the plurality of loudspeakers are provided with the multichannel signals or the monaural signal. For the monaural signal, the high adaptation speed is selected irrespectively of whether the state setting part sets the speech recognition part to an active or wait state. Therefore, fluctuations in impulse response on the echo path can be followed without degradation. As a result, an excellent echo canceling effect can be achieved in a wait state, and speech recognition performance immediately after a transition to an active state can be increased.

According to a fourteenth aspect, in the tenth aspect, the speech recognition apparatus further comprises:

a monaural level determination part for determining a monaural level of the multichannel signals; and an adaptation control part for controlling the adaptation speed of the adaptive digital filter based on the determined monaural level.

In the fourteenth aspect, the adaptation speed of the adaptive digital filter is controlled based on the monaural level of the multichannel signals. Therefore, appropriate echo cancellation can be made for multichannel signals varying in monaural level.

That is, if the monaural level is low, the adaptation speed is made low, thereby increasing noise resistance. On the other hand, if the monaural level is high, a small number of stereo components, which are noise for the adaptive digital filter, are present in the multichannel signals. Therefore, noise-resistance is not much required. Therefore, as in the following fifteenth aspect, with a high adaptation speed, fluctuations in impulse response on the echo path can be followed more. As a result, an excellent echo canceling effect can be achieved especially when the monaural level is high, and speech recognition performance immediately after a transition to an active state can be increased.

According to a fifteenth aspect, in the fourteenth aspect, the adaptation control part increases the adaptation speed of the adaptive digital filter as the monaural level of the multichannel signals is higher.

According to a sixteenth aspect, in the tenth aspect, the speech recognition apparatus further comprises a non-volatile memory, wherein:

the non-volatile memory receives and stores the impulse response estimated by the adaptive digital filter at power OFF, and provides, at power ON, the estimated impulse response stored at power OFF to the adaptive digital filter; and the adaptive digital filter starts estimating the impulse response by taking the estimated impulse response provided at power OFF by the non-volatile memory as an initial value.

In the sixteenth aspect, the estimated impulse response at power OFF is stored, and estimation of the impulse response is stared a power ON by taking the stored estimated impulse as the initial value. Therefore, compared with the case where 0 is taken as the initial value, estimation error immediately after power ON can be reduced. As a result, speech recognition performance is increased.

According to a seventeenth aspect, in the fifth aspect, the speech recognition apparatus further comprises a speech detection part for detecting the user's speech based on the monaural signal and the echo canceller output, wherein:

the start instruction part is implemented by a button switch that provides a start instruction to the state setting part when being pressed; and the end instruction part is implemented by a time switch that provides an end instruction to the state setting part after a predetermined period during which the speech detection part are not detecting the user's speech.

In the seventeenth aspect, speech recognition operation can be automatically ended.

According to an eighteenth aspect, in the fifth aspect, the speech recognition apparatus further comprises a speech detection part for detecting the user's speech based on the monaural signal and the echo canceller output, wherein:

the start instruction part is implemented by a voice switch that provides a start instruction to the state setting part when the speech detection part detects the user's speech; and the end instruction part is implemented by a time switch that provides an end instruction to the state setting part after a predetermined period during which the speech detection part are not detecting the user's speech.

In the eighteenth aspect, speech recognition operation can be automatically started and ended.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is block diagram exemplarily showing the structure of AV equipment to which the present invention is applied;

DESCRIPTION OF THE PREFERRED EMBODIMENTS

Figure 2:
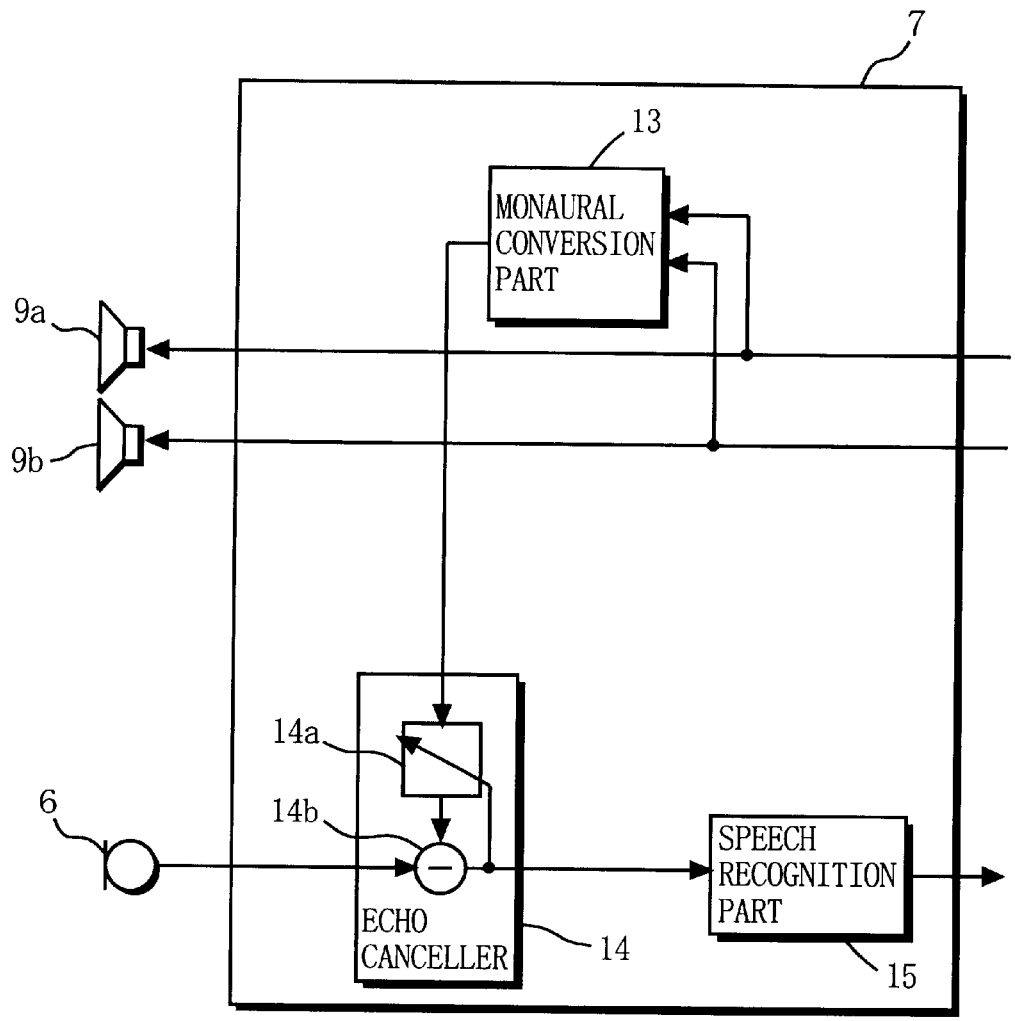
FIG. 2 is a block diagram showing the structure of a speech recognition apparatus for AV equipment according to a first embodiment of the present invention.

Embodiments of the present invention are now described below with reference to the drawings.

First, AV equipment to which the present invention is applied is described.

FIG. 1 is a block diagram exemplarily showing the structure of AV equipment to which the present invention is applied. The AV equipment shown in FIG. 1 is a television receiver for receiving television broadcasting. Assume herein that a multichannel (including 2-channel; ditto for the following) acoustic system is adopted in the television broadcasting.

In FIG. 1, the AV equipment includes an antenna 1, a receiver 2, an AV processor 3, a controller 4, a control panel 5, a microphone 6, a speech recognition apparatus 7, a display unit, 8, and a loudspeaker unit 9.

The antenna 1 catches radio waves from a broadcasting station, and converts them to electrical signals. The receiver 2 extracts a signal included in a specific frequency band from the electrical signals transmitted from the antenna 1. The AV processor 3 processes the signal from the receiver 2 to produce a video signal and a multichannel acoustic signal (hereinafter referred to as multichannel signal).

Responsive to a control signal from the control panel 5 or the speech recognition apparatus 7, the controller 4 controls the receiver 2 and/or AV processor 3 to execute a predetermined processing such as switching among receiving channels, adjusting the volume level, turning the main power ON/OFF, etc. The display unit 8 includes a display for displaying video responsive to the video signal from the AV processor 3. The loudspeaker unit 9 includes loudspeakers (9a, 9b, . . . ) for producing multichannel sound responsive to the multichannel signal from AV processor 3.

The control panel 5, which may be provided in the receiver body or on the remote controller 4, is composed of buttons, etc., and generates the control signal responsive to a user's button operation. The microphone 6 converts user's speech into an electrical signal. Responsive to the electrical signal from the microphone 6, the speech recognition apparatus 7 generates the control signal corresponding to the user's speech.

The signal from the receiver 2 may be an analog or digital signal. If the signal is an analog signal, the AV processor 3 is constructed of a circuit that processes the signal in an analog manner, and if it is digital, it is processed in a digital manner.

In the above-structured television receiver, the antenna 1 catches the radio waves transmitted from the broadcasting station, and converts them into electrical signals. The receiver 2 extracts a signal of a predetermined frequency band from the electrical signals. Then, the AV processor 3 processes the signal from the receiver 2 to output a video signal and a multichannel signal. The video signal is provided from the AV processor 3 to the display unit 8, and video is displayed on a display therein. The multichannel signal is, on the other hand, provided to the loudspeaker unit 9, and multichannel sound is produced from the plurality of loudspeakers therein.

The user can control the television receiver to switch among receiving channels by operating the control panel 5. That is, the control panel 5 generates a control signal corresponding to the user's button operation, and responsive to the control signal, the controller 4 makes the receiver 2 and/or AV processor 3 execute switching among the receiving channels, etc.

In the foregoing, the television receiver for producing multichannel sound has been exemplarily described as the AV equipment to which the present invention is applied. However, application of the present invention is not limited to television receivers, but may be radio receivers for producing multichannel sound. Alternatively, the present invention may be applied to any apparatuses or systems such as reproducers for reproducing sound on media such as CDs and DVDs on which multichannel signals have been written, and multichannel audio systems composed of an amplifier, the loudspeaker unit 9, etc.

First Embodiment

FIG. 2 is a block diagram showing the structure of a speech recognition apparatus for AV equipment according to a first embodiment of the present invention. In FIG. 2, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 2, the speech recognition apparatus 7 includes a monaural conversion part 13, a single echo canceller 14, and a speech recognition part 15. The signals provided to the loudspeakers 9a and 9b are 2-channel signals outputted from the AV processor 3 of FIG. 1.

The 2-channel signals transmitted toward the loudspeakers 9a and 9b are branched to the monaural conversion part 13. The monaural conversion part 13 converts these 2-channel signals into a monaural signal.

A signal outputted from the microphone 6 (microphone output) and a signal outputted from the monaural conversion part 13 (monaural signal) are provided to the echo canceller 14. The echo canceller 14 extracts only the signal that corresponds to user's speech from the microphone output.

Here, the operational principle of the echo canceller 14 is briefly described. The echo canceller 14 includes an adaptive digital filter 14a and a subtraction circuit 14b. The microphone output includes, in addition to the user's speech, a signal that resulted from the sound outputted from the loudspeakers 9a and 9b echoing back from the interior of a room into the microphone 6. Such signal is hereinafter referred to as an echo signal.

The adaptive digital filter 14a is provided with the monaural signal, and also a signal fed back from the subtraction circuit 14b. Based on these two signals, the adaptive digital filter 14a estimates the echo signal. The estimated echo signal obtained in the above-described manner and the microphone output are provided to the subtraction circuit 14b. The subtraction circuit 14b subtracts the estimated echo signal from the microphone output. Thus, the echo canceller 14 outputs user's speech with the echo signal eliminated.

The speech recognition part 15 recognizes the user's speech from the echo canceller 14 to generate a control signal indicating a control specified by the speech. The generated control signal is forwarded to the controller 4 of FIG. 1. The controller 4 controls the receiver 2 and AV processor 3 to execute switching among the receiving channels and other processing in the television receiver.

Figure 3:
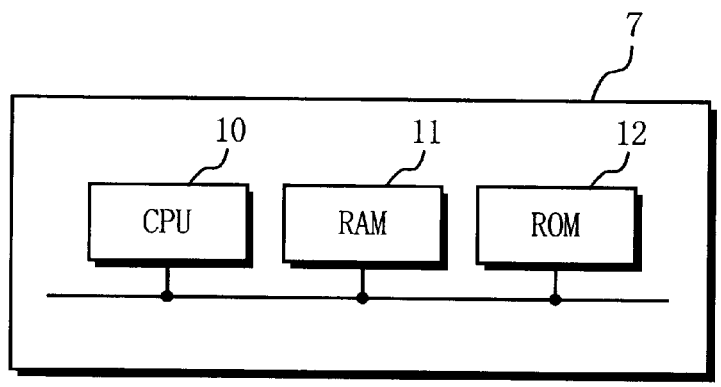
FIG. 3 is a block diagram showing the structure in hardware of the speech recognition apparatus 7 of FIG. 1.

FIG. 3 is a block diagram showing the hardware structure of the speech recognition apparatus 7 of FIG. 1. In FIG. 3, the speech recognition apparatus 7 includes a CPU 10, RAM 11, and ROM 12. In the ROM 12, a predetermined program is stored in advance. Written in this program are (a) an algorithm for converting 2-channel signals into a monaural signal; (b) an algorithm for eliminating an echo signal from microphone output; (c) an algorithm for recognizing user's speech and generating a control signal; etc. The CPU 10 operates according to the above program while using the RAM 11 as a work area. With such structure, the function of each block shown in FIG. 2 is achieved. Note that the function of each block can also be achieved by each dedicated piece of hardware instead of software.

Figure 4:
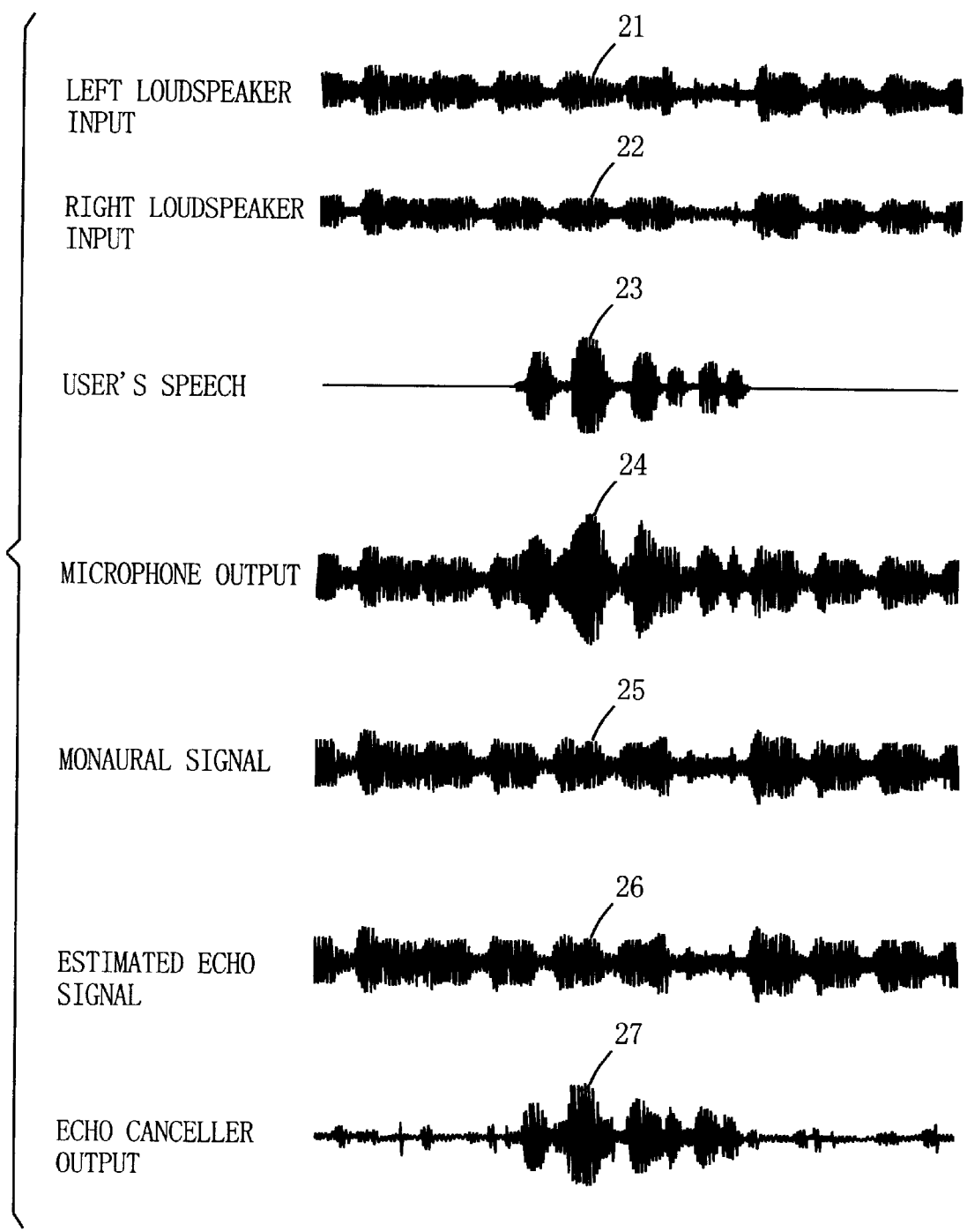
FIG. 4 is a diagram showing time waveforms of signals inputted to or outputted from components in the speech recognition apparatus 7 of FIG. 2.

With reference to FIG. 4, the operation of the speech recognition apparatus for AV equipment 7 as structured above is now described below. FIG. 4 is a diagram showing time waveforms of signals inputted to or outputted from the components in the speech recognition apparatus 7 of FIG. 2.

First, assume in FIG. 4 that the user makes a speech 23 while a left loudspeaker input 21 and a right loudspeaker input 22 are being provided to the loudspeakers 9a and 9b, respectively. At this time, the microphone 6 outputs a microphone output signal 24 with echoes of the left loudspeaker input 21 and the right loudspeaker input 22 and the user's speech 23 added altogether. On the other hand, the left loudspeaker input 21 and the right loudspeaker input 22 are also provided to the monaural conversion part 13, and added together therein to become a monaural signal 25.

This monaural signal 25 is provided to the echo canceller 14. The echo canceller 14 estimates an estimated echo signal 26 from the provided monaural signal 25 and an estimated impulse response stored therein. The echo canceller 14 further subtracts the estimated echo signal 26 from the microphone output signal 24 to obtain an echo canceller output signal 27. This echo canceller output signal 27 is provided to the speech recognition part 15. Compared with the user's speech 23 and the microphone output signal 24,the echo signal is substantially and effectively cancelled out in the echo canceller output signal 27.

Described next is why the stereo signals (hereinafter, 2-channel signals may be occasionally referred to as stereo signals as appropriate) can be cancelled out by the single echo canceller 14.

An echo signal Se mixed into the output from the microphone 6 is Se=(Sr×Hr+Sl×Hl), where transmission characteristics (impulse response) from the loudspeaker 9a for right channel to the microphone 6 is Hr. transmission characteristics from the loudspeaker 9b for left channel to the microphone 6 is Hl, a right-channel signal Sr, and a left-channel signal is Sl.

Here, if the left and right transmission characteristics are approximately equal, that is, Hr≈Hl (≈H), Se≈(Sr+Sl)×H. If the left- and right-channel signals are approximately equal, that is, Sr≈Sl (≈S), Se≈S×(Hr+Hl). Therefore, if either assumption holds, the single echo canceller 14 can cancel out the stereo signals.

Key determinants of the transmission characteristics Hr and Hl are the distance between the loudspeakers 9a and 9b and the microphone 6 and their reflection patterns in the room. In actual listening, if the microphone 6 is placed near the user, the distance between the microphone 6 for speech recognition and the loudspeaker 9a for right channel is, as a matter of course, approximately equal to the distance between the microphone 6 and the loudspeaker 9b for left channel. Also, if the microphone 6 is placed at the center on the television, these distances become approximately equal. Furthermore, their reflection patterns in the room are approximately symmetrical accordingly.

Since the signal wavelength is short in high frequencies, the phase is reversed even with a slightest difference in distance. Therefore approximately equal distance is not sufficient for coincidence in transmission characteristics including phase. In low and intermediate frequencies, however, the transmission characteristics often coincide with each other sufficiently. Therefore, Hr≈Hl holds, and the effect of cancellation can be expected even with a single echo canceller 14.

Moreover, sounds for TV programs, etc., are often created in actuality as such that center-localized sounds (monaural components) are mixed evenly for both right and left channels at a relatively high level, and sounds to be localized to right and left (stereo components) are mixed therewith at a relative low level. In other words, sound creation is focused on the center sound source, and right and left loudspeaker inputs 21 and 22 are mainly monaural components. For such audio signal mainly based on the center sound source, Sr≈Sl holds, and the effect of cancellation can be expected even with a single echo canceller 14.

For the above reasons, in actual TV watching, it has been shown that a sufficient echo cancellation effect can be obtained even with the speech recognition apparatus 7 as shown in FIG. 2.

As stated above, according to the present embodiment, even a single echo canceller can support a stereo source (2-channel signals), thereby achieving the speech recognition apparatus for AV equipment at low cost. Moreover, a single echo canceller does not cause mutual interference among echo cancellers, thereby ensuring stable operation, which is an extremely important effect in practical use.

Note that, in the first embodiment (and second to fourth, and sixth to thirteenth embodiments, which will be described later), in the AV equipment of FIG. 1, 2-channel signals are outputted from the AV processor 3, and 2-channel sound is reinforced through the loudspeaker unit 9. Alternatively, multichannel signals such as 4-channel or 6-channel signals may be outputted from the AV processor 3, and multichannel sound such as 4-channel or 6-channel sound may be outputted from the AV processor 3. In such case, the program stored in the ROM 12 (or the structure of the dedicated hardware) is altered so that the monaural conversion part 13 of FIG. 2 converts that multichannel signals.

In this case, the monaural conversion part 13 may add all channel signals together, or may add only main channel signals such as right, left, and center forward. Furthermore, instead of evenly adding these multichannel signals together, the monaural conversion part 13 may assign weights to part of these signals before addition.

Second Embodiment

Figure 5:
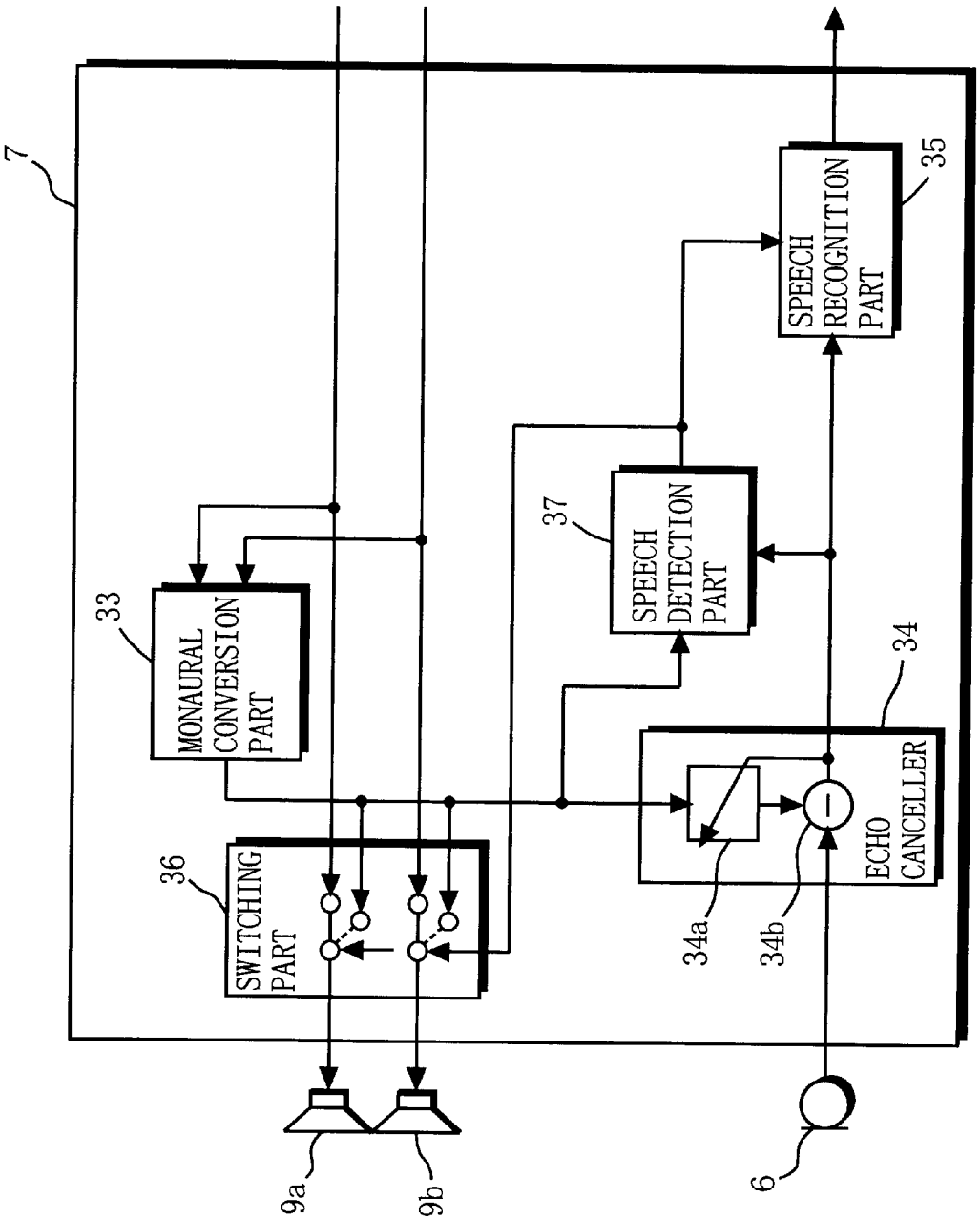
FIG. 5 is a block diagram showing the structure of a speech recognition apparatus for AV equipment according to a second embodiment of the present invention.

FIG. 5 is a block diagram showing the structure of a speech recognition apparatus for AV equipment according to a second embodiment of the present invention. In FIG. 5, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 5, the speech recognition apparatus 7 includes a monaural conversion part 33, a single echo canceller 34, a speech recognition part 35, a speech detection part 37, and a switching part 36. That is, the speech recognition apparatus 7 of FIG. 5 equals in structure to the speech recognition apparatus 7 of FIG. 2 (first embodiment) with the speech detection part 37 and the switching part 36 added thereto. The signals provided to the loudspeakers 9a and 9b are 2-channel signals outputted from the AV processor 3 of FIG. 1.

The 2-channel signals transmitted toward the loudspeakers 9a and 9b are branched to the monaural conversion part 33. The monaural conversion part 33 converts these 2-channel signals into a monaural signal.

A signal outputted from the microphone 6 (microphone output) and a signal outputted from the monaural conversion part 33 (monaural signal) are provided to the echo canceller part 34. The echo canceller 34 extracts only the signal that corresponds to user's speech from the microphone output. Note that the operational principle of the echo canceller 34 has been described in the first embodiment.

The speech detection part 37 is provided with an output from the monaural conversion part 33 (monaural signal) and an output from the echo canceller 34 (user's speech). The speech detection part 37 detects the user's speech based on the ratio between these output in level. If the speech detection part 37 detects user's speech, the switching part 36 switches inputs to the loudspeakers 9a and 9b from 2-channel signals (at non-detection) to monaural signals. On the other hand, if the speech detection part 37 changes its state for not detecting user's speech, the switching part 36 switches inputs to the loudspeakers 9a and 9b from monaural signals (at detection) to 2-channel signals.

If the speech detection part 37 detects user's speech, the speech recognition part 35 starts speech recognition operation, recognizing the user's speech from the echo canceller 34 and generating a control signal indicative of a control specified by the speech. The generated control signal is forwarded to the controller 4 of FIG. 1. The controller 4 controls the receiver 2 and AV processor 3 to execute switching among the receiving channels and other processing in the television receiver.

The hardware structure of the speech recognition apparatus 7 of FIG. 5 is similar to that of FIG. 3. In FIG. 3, a predetermined program is previously stored in the ROM 12. In addition to the algorithms (a) to (c) as stated in the first embodiment, (d) an algorithm for detecting user's speech and (e) an algorithm for switching input signals to the loudspeakers 9a and 9b are written in the program. The CPU 10 operates according to the above program while using the RAM 11 as a work area. With such structure, the function of each block shown in FIG. 5 is achieved. Note that the function of each block can also be achieved by each dedicated piece of hardware instead of software.

Figure 6:
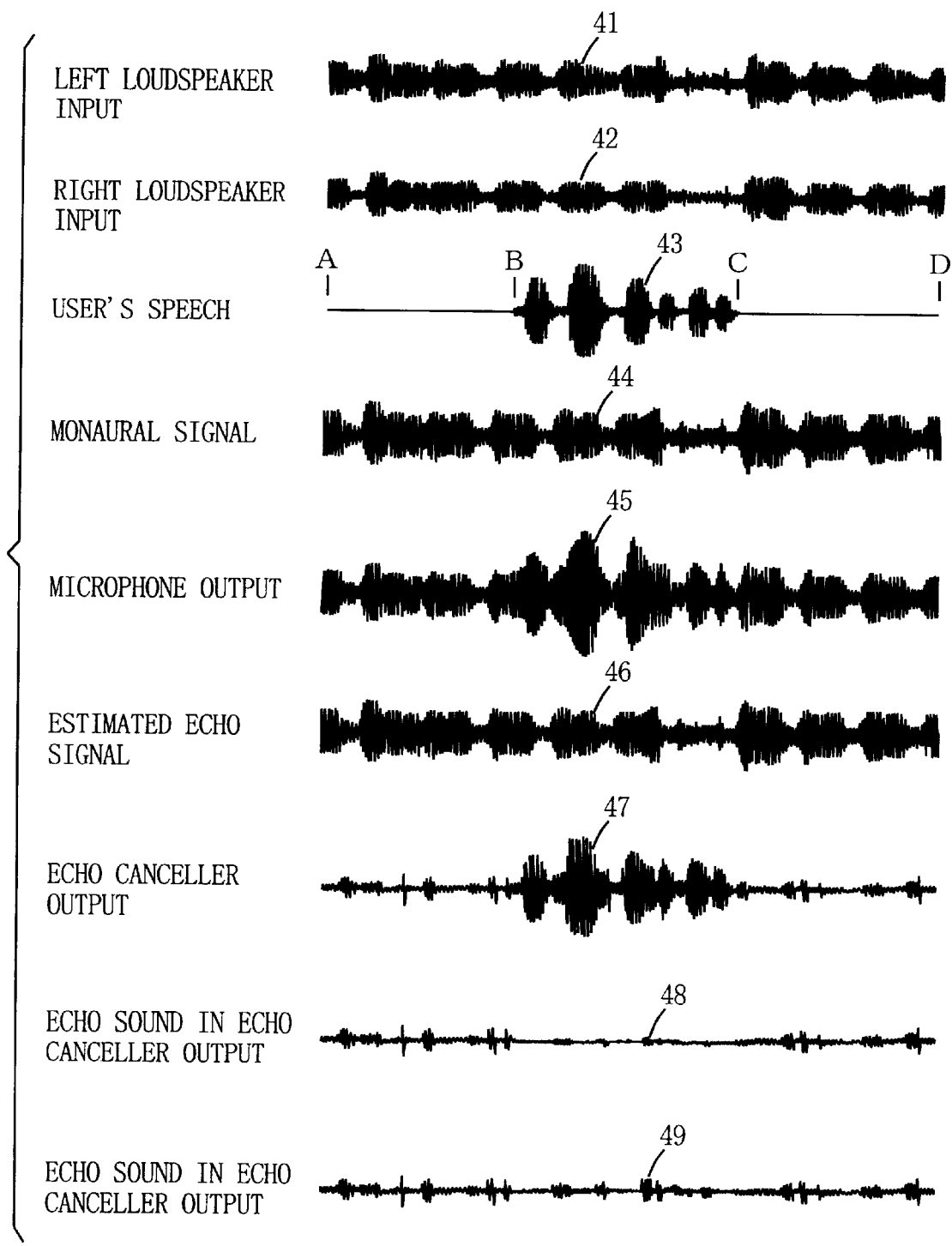
FIG. 6 is a diagram showing time waveforms of signals inputted to or outputted from components in the speech recognition apparatus 7 of FIG. 5.

With reference to FIG. 6, the operation of the speech recognition apparatus for AV equipment 7 as structured above is now described below. FIG. 6 is a diagram showing time waveforms of signals inputted to or outputted from the components in the speech recognition apparatus 7 of FIG. 5.

First, similarly to the first embodiment, assume in FIG. 6 that the user makes a speech 43 while a left loudspeaker input 41 and a right loudspeaker input 42 are being provided to the loudspeakers 9a and 9b, respectively. At this time, the monaural conversion part 33 outputs a signal 44. In the speech recognition apparatus 7 of FIG. 3, the speech detection part 37 determines whether the user made a speech or not. During periods A-B and C-D indicated in the user's speech 43 when the user does not make a speech, the switching part 36 switches inputs to the loudspeakers 9a and 9b to the stereo signal side. On the other hand, during a period B-C when the user makes a speech, the switching part 36 switches the inputs to the monaural signal side. Here, the microphone outputs a signal 45 shown in FIG. 6.

The echo canceller 34 is always provided with the monaural signal 44. The echo canceller 34 estimates an estimated echo signal 46 from the provided monaural signal 44 and an estimated impulse response stored therein. The echo canceller 34 then subtracts the estimated echo signal 46 from the microphone output signal 45 to obtain an echo canceller output signal 47.

In the speech recognition apparatus 7 of FIG. 5, the speech detection part 37 monitors a ratio in level between the monaural signal 44 and the echo canceller signal 47. If the echo canceller output signal 47 becomes higher in level than the echo signal estimated from the monaural signal 44 and the transmission characteristics in a echo path, the speech detection part 37 determines that the user made a speech. The switching part 36 switches inputs to the loudspeakers 9a and 9b to the monaural signals 44. If the inputs to the loudspeakers 9a and 9b are switched to a monaural signal (Sr+Sl), the echo signal Se becomes Se=(Sr+Sl)×(Hr+Hl), which can be completely cancelled out in principle by the single echo canceller 34. In the structure of FIG. 2, for an audio signal having so many stereo components that the assumption Sr≈Sl cannot hold, the cancellation effect of the echo canceller 34 is impaired, as a matter of course. As a result, the echo signal is mixed into the speech to be inputted to the speech recognition part 35 to deteriorate the speech recognition performance. In the structure of FIG. 5, however, the echo signal can be completely cancelled out even in that case, and therefore the speech recognition part 35 can carry out speech recognition with high accuracy.

In FIG. 6, an echo signal included in the echo canceller output signal 47 in the speech recognition apparatus 7 of FIG. 5 is extracted and indicated by a reference numeral 48, while an echo signal included in the echo canceller output signal 27 in the speech recognition apparatus 7 of FIG. 2 is extracted and indicated by a reference numeral 49. As can be seen from FIG. 6, in the present embodiment, the echo signal 48 is more effectively cancelled out compared with the echo signal 49 during the period B-C when the user's speech is being inputted, and thus the S/N ratio for speech recognition is significantly improved.

As stated above, according to the present embodiment, normal stereo reproduction is switched to monaural reproduction only when the user makes a speech. Therefore, the user's speech can be extracted at a higher S/N ratio, and thus recognition performance can be increased.

Third Embodiment

Figure 7:
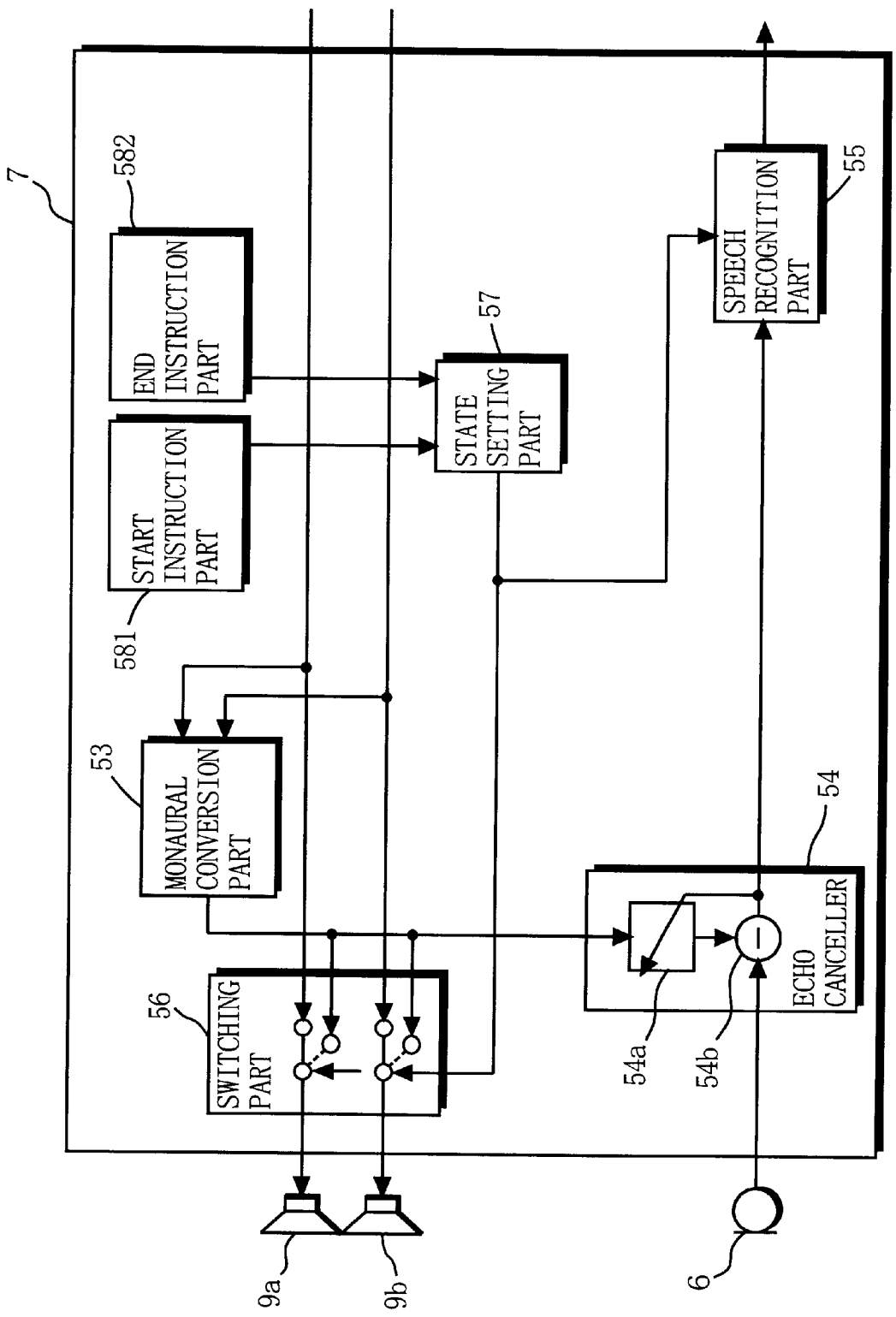
FIG. 7 is a block diagram showing the structure of a speech recognition apparatus for AV equipment according to a third embodiment of the present invention.

FIG. 7 is a block diagram showing the structure of a speech recognition apparatus for AV equipment according to a third embodiment of the present invention. In FIG. 7, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 7, the speech recognition apparatus 7 includes a monaural conversion part 53, a single echo canceller 54, a speech recognition part 55, a start instruction part 581, an end instruction part 582, a state setting part 57, and a switching part 56. That is, the speech recognition apparatus 7 of FIG. 7 equals in structure to the speech recognition apparatus 7 of FIG. 2 (first embodiment) with the start instruction part 581, the end instruction part 582, the state setting part 57, and the switching part 56 added thereto. The signals provided to the loudspeakers 9a and 9b are 2-channel signals outputted from the AV processor 3 of FIG. 1.

The 2-channel signals transmitted toward the loudspeakers 9a and 9b are branched to the monaural conversion part 53. The monaural conversion part 53 converts these 2-channel signals into a monaural signal.

A signal outputted from the microphone 6 (microphone output) and a signal outputted from the monaural conversion part 53 (monaural signal) are provided to the echo canceller 54. The echo canceller 54 extracts only the signal that corresponds to user's speech from the microphone output. Note that the operational principle of the echo canceller 34 has been described in the first embodiment.

The start instruction part 581 instructs a start of speech recognition operation. The end instruction part 582 instructs an end of speech recognition operation. The state setting part 57 is responsive to the instruction from the start instruction part 581 or the end instruction part 582 to set an operation state of the speech recognition part 55 (i.e., to set speech recognition operation ON/OFF). If the state setting part 57 sets the speech recognition operation ON, the switching part 56 switches inputs to the loudspeakers 9*a* and 9*b* from 2-channel signals (in OFF state) to monaural signals. On the other hand, if the state setting part 57 sets it OFF, the switching part 56 switches these inputs from monaural signals (in ON state) to 2-channel signals.

The speech recognition part 55 executes or ends speech recognition based on the setting by the state setting part 57. That is, the speech recognition part 55 recognizes user's speech from the echo canceller 54 to generate a control signal indicative of a control specified by the speech. The generated control signal is forwarded to the controller 4 of FIG. 1. The controller 4 controls the receiver 2 and AV processor 3 to execute switching among the receiving channels and other processing in the television receiver.

The hardware structure of the speech recognition apparatus 7 of FIG. 7 is similar to that of FIG. 3. In FIG. 3, a predetermined program is previously stored in the ROM 12. In addition to the algorithms (a) to (c) as stated in the first embodiment and the algorithm (e) as stated in the second embodiment, (f) an algorithm for setting an operation state of the speech recognition part 55 is further written in the program. The CPU 10 operates according to the above program while using the RAM 11 as a work area. With such structure, the function of each block shown in FIG. 7 is achieved.

Note that the start instruction part 581 and the end instruction part 582 are implemented as the buttons composing the control panel of FIG. 1. Moreover, the function of each block other than the start instruction part 581 and the end instruction part 582 can also be achieved by each dedicated piece of hardware instead of software.

The operation of the above-structured speech recognition apparatus for AV equipment 7 is now described below.

The speech recognition apparatus 7 of FIG. 7 is different in structure from that of FIG. 5 in that, not the speech detection part 37, but the start instruction part 581, the end instruction part 582, and the state setting part 57 control the switching part 56. To utilize the speech recognition function, the start instruction part 581 sends a signal for starting the speech recognition function to the state setting part 57. The state setting part 57 then controls the switching part 56 to switch signals to be inputted to the loudspeakers 9*a* and 9*b* from stereo to monaural, changing the speech recognition state from a wait state where stereo signals are being inputted to the loudspeakers 9*a* and 9*b* to an active state where monaural signals are being inputted thereto.

In the active state, the user cannot feel a sense of stereo, but that does not matter much in audio listening. In other words, in the active state, the echo signal canceling effect is at its best, and therefore speech recognition with high accuracy can be expected. For recovering the sense of stereo, the end instruction part 582 sends a signal for ending the speech recognition function to the state setting part 57. The state setting part 57 controls the switching part 56 to switch signals to be inputted to the loudspeakers 9*a* and 9*b* from monaural to stereo, changing the speech recognition state from the active state where the monaural signals are being inputted to the loudspeakers 9*a* and 9*b* to the wait state where the stereo signals are being inputted thereto.

Figure 8:
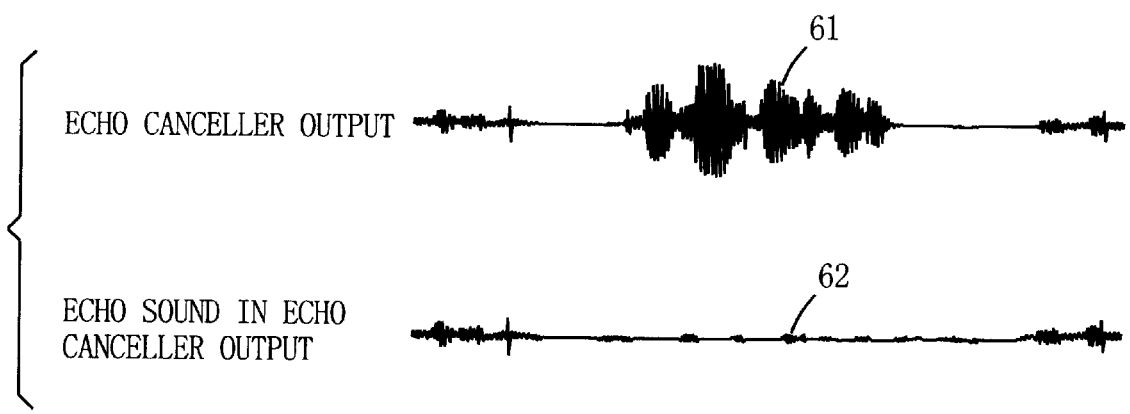
FIG. 8 is a diagram showing time waveforms of signals inputted to or outputted from components in the speech recognition apparatus 7 of FIG. 7.

FIG. 8 is a diagram showing time waveforms of signals inputted to or outputted from the components of the speech recognition apparatus 7 of FIG. 7. An input signal to the speech recognition part 55 in the active state is indicated by a reference numeral 61, while an echo signal included in the input signal is indicated by a reference numeral 62. As can be seen from the signals 61 and 62 of FIG. 8 and the signals 47 and 48 of FIG. 6, the speech recognition apparatus 7 of FIG. 7 is significantly improved in S/N ratio at the head and end of the speech compared with that of FIG. 5. In the structure of FIG. 5, several 10 msec is required for speech detection, and therefore a poor SIN ratio at the head of several 10 msec causes hard recognition of a consonant at the head of the speech. In the structure of FIG. 7, this drawback can be completely overcome.

As stated above, according to the present embodiment, normal stereo reproduction is switched to monaural reproduction only when the speech recognition function is required. Therefore, the user's speech can be extracted at an S/N ratio higher than that in the second embodiment, and thus recognition performance can be further increased.

Fourth Embodiment

Figure 9:
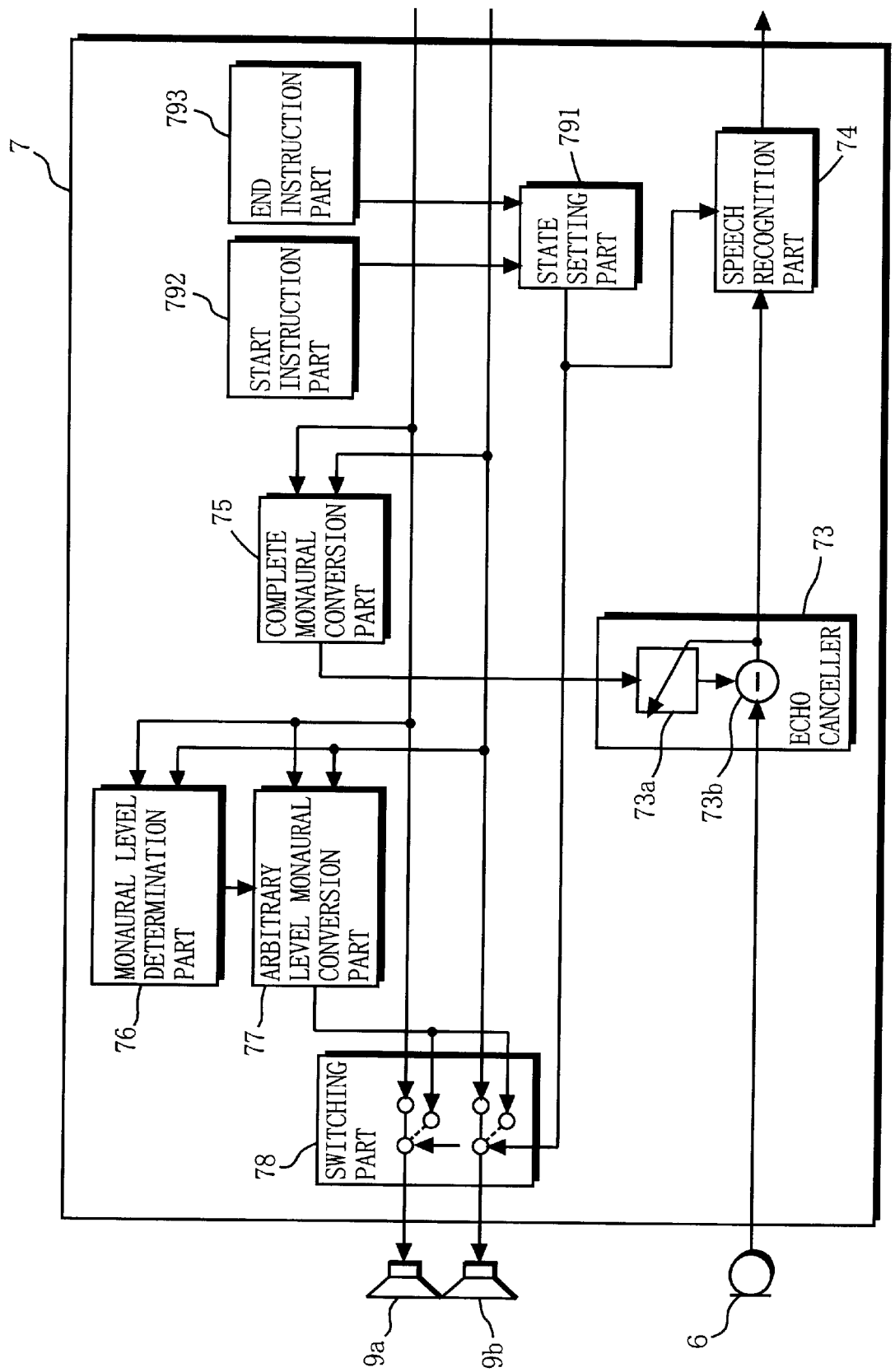
FIG. 9 is a block diagram showing the structure of a speech recognition apparatus for AV equipment according to a fourth embodiment of the present invention.

FIG. 9 is a block diagram showing the structure of a speech recognition apparatus for AV equipment according to a fourth embodiment of the present invention. In FIG. 9, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9*a* and 9*b* included in the loudspeaker unit 9.

In FIG. 9, the speech recognition apparatus 7 includes a complete monaural conversion part 75, a monaural level determination part 76, an arbitrary level monaural conversion part 77, a single echo canceller 73, a speech recognition part 74, a start instruction part 792, an end instruction part 793, a state setting part 791, and a switching part 78. That is, the speech recognition apparatus 7 of FIG. 9 equals in structure to the speech recognition apparatus 7 of FIG. 7 (third embodiment) with the monaural level determination part 76 and the arbitrary level monaural conversion part 77 added thereto. Note that the complete monaural conversion part 75 is distinguished by the word "complete" from the arbitrary level monaural conversion part 77, but in fact is similar to the monaural conversion part 53 of FIG. 7. The signals provided to the loudspeakers 9*a* and 9*b* are 2-channel signals outputted from the AV processor 3 of FIG. 1.

The 2-channel signals toward the loudspeakers 9*a* and 9*b* are branched to the complete monaural conversion part 75. The complete monaural conversion part 75 converts these 2-channel signals into a complete monaural signal.

Furthermore, the 2-channel signals toward the loudspeakers 9*a* and 9*b* are branched to the monaural level determination part 76 and the arbitrary level monaural conversion part 77. The monaural level determination part 76 determines the monaural level of these 2-channel signals. The arbitrary level monaural conversion part 77 converts these 2-channel signals into a monaural signal at an arbitrary level based on the determination of the monaural level determination part 76.

That is, the arbitrary level monaural conversion part 77 increases the monaural level of these 2-channel signals based on the current monaural level. For this purpose, the arbitrary level monaural conversion part 77 stores a function for determining, based on the present monaural level, at which strength the monaural level should be increased (process strength determination characteristic as indicated by 101 of FIG. 12A).

Here, the monaural level of the above 2-channel signal is a ratio of signal components (monaural components) commonly included in both channels to one of the signals. If the signals of both channels have no correlation to each other, the monaural level is "0". If these signals are equal, the monaural level is "1".

A signal outputted from the microphone 6 (microphone output) and a signal outputted from the complete monaural conversion part 75 (complete monaural signal) are provided to the echo canceller 73. The echo canceller 73 extracts only the signal that corresponds to user's speech from the microphone output. Note that the operational principle of the echo canceller 73 has been described in the first embodiment.

The start instruction part 792 instructs a start of speech recognition operation. The end instruction part 793 instructs an end of speech recognition operation. Responsive to the instruction from the start instruction part 792 or end instruction part 793, the state setting part 791 sets an operation state of the speech recognition part 74 (i.e., to set speech recognition operation ON/OFF).

Signals outputted from the arbitrary level monaural conversion part 77 (arbitrary level monaural signals) and 2-channel signals outputted from the AV processor 3 of FIG. 1 are provided to the switching part 78. If the state setting part 791 sets the speech recognition operation ON, the switching part 78 switches inputs to the loudspeakers 9a and 9b from the 2-channel signals (in the OFF state) to the arbitrary level monaural signals. If the state setting part 791 sets the speech recognition operation OFF, the switching part 78 switches inputs to the loudspeakers 9a and 9b from the arbitrary level monaural signals (in the ON state) to the 2-channel signals.

The speech recognition part 74 executes or ends speech recognition based on the setting by the state setting part 791. That is, the speech recognition part 74 recognizes user's speech from the echo canceller 73 to generate a control signal indicating a control specified by the speech. The generated control signal is forwarded to the controller 4 of FIG. 1. The controller 4 controls the receiver 2 and AV processor 3 to execute switching among the receiving channels and other processing in the television receiver.

The hardware structure of the speech recognition apparatus 7 of FIG. 9 is similar to that of FIG. 3. In FIG. 3, a predetermined program is previously stored in the ROM 12. In addition to the algorithms (a) to (c) as stated in the first embodiment, the algorithm (e) as stated in the second embodiment, and the algorithm (f) as stated in the third embodiment, (g) an algorithm for determining a monaural level of 2-channel signals and (h) an algorithm for converting 2-channel signals at an arbitrary monaural level are further written in the program. The CPU 10 operates according to the above program while using the RAM 11 as a work area. With such structure, the function of each block shown in FIG. 7 is achieved.

Note that the start instruction part 792 and the end instruction part 793 are implemented as the buttons composing the control panel of FIG. 1. Moreover, the function of each block other than the start instruction part 792 and the end instruction part 793 can also be achieved by each dedicated piece of hardware instead of software.

The operation of the above-structured speech recognition apparatus for AV equipment 7 is now described below.

In the speech recognition apparatus 7 of FIG. 7, at the active state of speech recognition ("ON" state), the stereo signals are completely converted to monaural signals for reproduction at the loudspeakers 9a and 9b. Therefore, the user cannot feel a sense of stereo at all. On the other hand, in the speech recognition apparatus 7 of FIG. 2 that carries out stereo reproduction during an active state of speech recognition, the amount of echo cancellation by the echo canceller 14 is significantly deteriorated while an audio signal of a low monaural level, in which the assumption Sr≈Sl does not hold, is being inputted. However, as stated above, in normal TV stereo programs, for example, it is not often the case where audio signals having a low correlation to each other are mixed into right and left channels so as to significantly deteriorate the amount of cancellation by the echo canceller 14. It is often the case that sounds from right and left sources are mixed into sound from the center source that is equally mixed into right and left. Therefore, even in stereo broadcasting, the assumption Sr≈Sl, which indicates a strong correlation between right and left channels, holds for a long period of time. The point is how to cope with a time period of a weak correlation.

Therefore, in the present embodiment, the echo canceller 73 is always provided with a complete monaural signal by the complete monaural conversion part 75, while the loudspeakers 9a and 9b are provided with stereo signals in the wait state of speech recognition ("OFF" state) and with outputs from the arbitrary level monaural conversion part 77 in the active state. The monaural level determination part 76 monitors the monaural level of the signals. When the monaural level is determined to be low, the arbitrary level monaural conversion part 77 increases the strength of monaural conversion. This can ensure the correlation between the right and left channels always at more than a predetermined level.

To utilize the speech recognition function, similarity to the speech recognition apparatus 7 of FIG. 7, the start instruction part 792 of FIG. 9 sends a signal for starting the speech recognition function to the state setting part 791. The state setting part 791 then controls the switching part 78 to switch signals to be inputted to the loudspeakers 9a and 9b from stereo to outputs from the arbitrary level monaural conversion part 77, changing the speech recognition state from a wait state where stereo signals are being inputted to the loudspeakers 9a and 9b to an active state where monaural signals at the arbitrary level are being inputted thereto. The monaural level determination part 76 always monitors the monaural level of the audio signals. Only when the monaural level is determined to be low, the arbitrary level monaural conversion part 77 carries out arbitrary level monaural conversion. Although the user cannot feel, for a moment, a sense of stereo in the audio signals at a low monaural level, echo can be sufficiently cancelled out.

Figure 10:
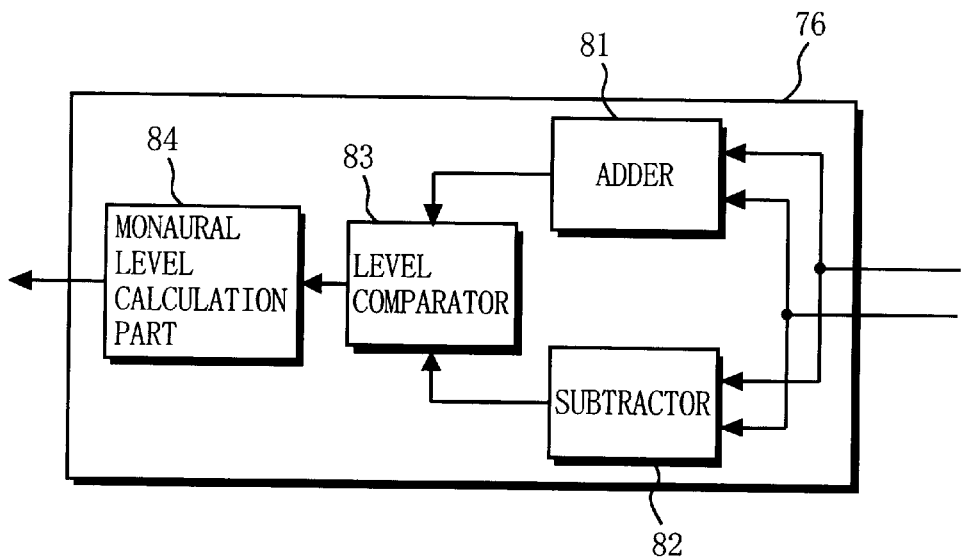
FIG. 10 is a block diagram showing a monaural level determination part 76 of FIG. 9 in detail.

FIG. 10 shows the monaural level determination part 76 of FIG. 9 in detail. In FIG. 10, the monaural level determination part 76 includes an adder 81, a subtractor 82, a level comparator 83, and a monaural level calculation part 84.

Complete monaural signals show the relation Sr=Sl. Therefore, an output from the adder 81 becomes 2Sr; an output from the subtractor 82 becomes 0; and {(output level of the subtractor 82)/(output level of the adder 81)} calculated by the level comparator 83 also becomes 0. On the other hand, complete stereo signals show no correlation at all between Sr and Sl. Therefore, the output from the adder 81 becomes Sr+Sl, and the output from the subtractor 82 becomes Sr−Sl. Since Sr and Sl have no correlation at all, Sr+Sl equals in level to Sr−Sl, and therefore the output from the level comparator 83 becomes 1. Then, the monaural level calculation part 84 calculates {1−(output from the level comparator)}. The monaural level determination part 76 outputs 1 for complete monaural signals, while outputting 0 for complete stereo signals.

As such, the monaural level determination part 76 outputs a value in the range of 1 to 0 based on the monaural level of the input signal. By monitoring this value, the monaural level of the input signal can be determined.

Figure 11:
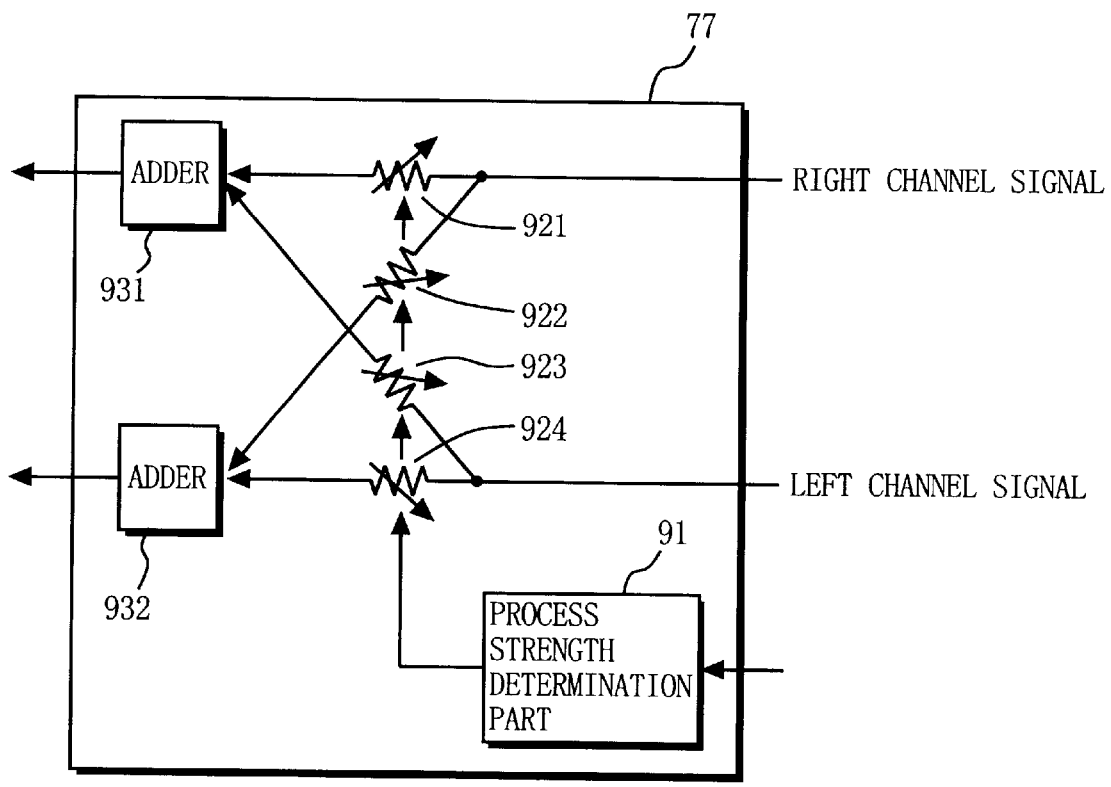
FIG. 11 is a block diagram showing an arbitrary level monaural conversion part 77 in detail.

FIG. 11 shows the arbitrary level monaural conversion part 77 of FIG. 9 in detail. In FIG. 11, the arbitrary level monaural conversion part 77 includes a process strength determination part 91, attenuators 921 to 924, and adders 931 and 932.

The output from the monaural level calculation part 84 of FIG.10 is provided to the process strength determination part 91 of FIG. 11. Based on the received input, the process strength determination part 91 determines the process strength of monaural conversion. Based on the process strength, the amount of attenuation in each of the attenuators 921 to 924 is controlled.

Figure 12A:
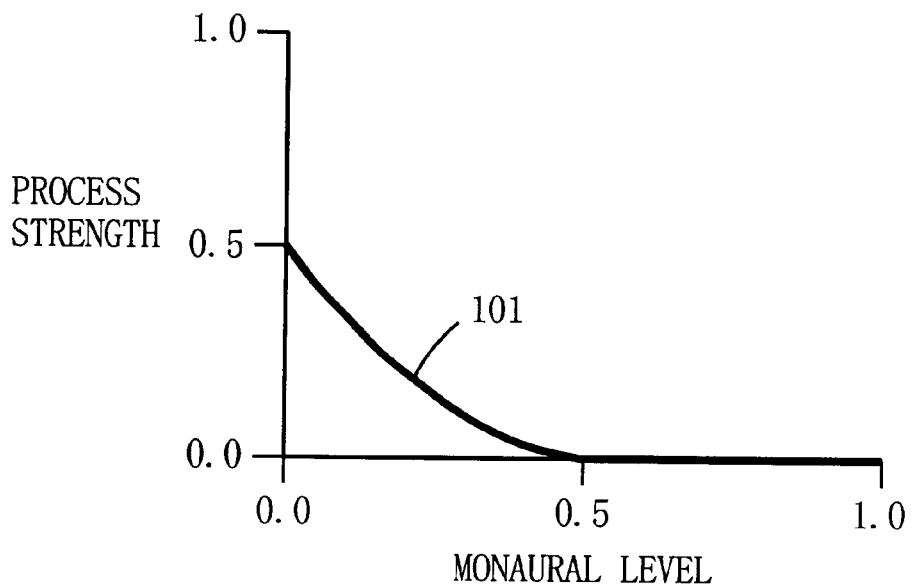
FIG. 12A is a diagram showing strength in monaural conversion performed by a process strength determination part 91 of FIG. 11.
Figure 12B:
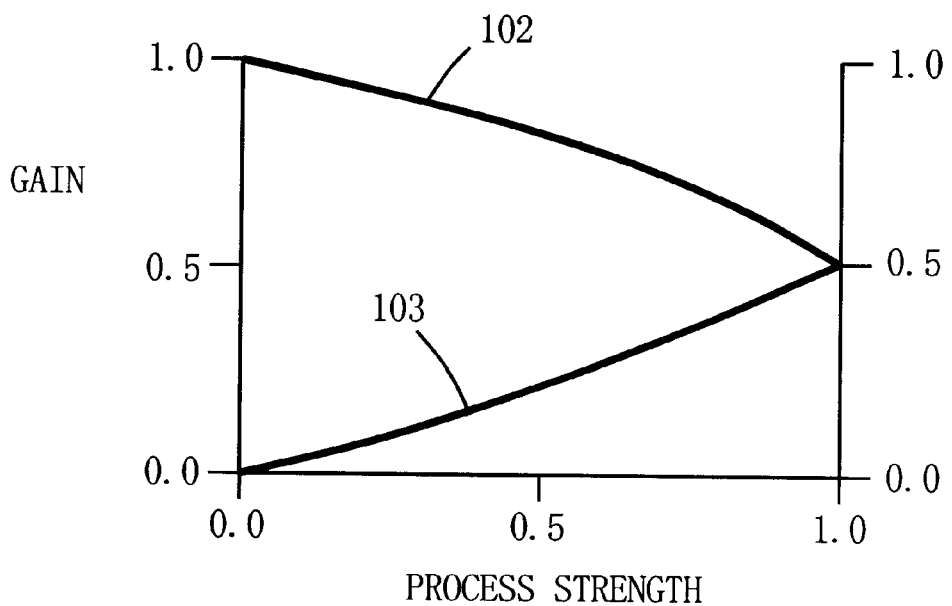
FIG. 12B is a diagram showing gain (attenuation) achieved through attenuators 921 to 924 of FIG. 11.

FIG. 12A is a diagram showing strength in monaural conversion performed by the process strength determination part 91 of FIG. 11, and FIG. 12B is a diagram showing gain (attenuation) achieved through the attenuators 921 to 924 of FIG. 11.

In FIG. 12A, a characteristic curve 101 indicates a relation between the monaural level inputted to the process intensity determination part 91 of FIG. 11 and the process strength outputted from the process strength determination part 91. In FIG. 12B, characteristic curves 102 and 103 indicate how the gain in the attenuators 921 to 924 are controlled by the process strength outputted from the process strength determination part 91. The characteristic curve 102 indicates gains in the attenuators 921 and 924, while the characteristic curve 103 indicates that in the attenuators 922 and 923.

In the present embodiment, as indicated by the characteristic curve 101, if the monaural level of the input signal is within the range of 1.0 to 0.5, the process strength determination part 91 outputs 0 to the attenuators 921 to 924 as the process strength for monaural conversion. If the process strength for monaural conversion is 0, the arbitrary level monaural conversion part 77 does not carry out monaural conversion, as indicated by the characteristic curves 102 and 103.

The process strength determination part 91 outputs the process strength for monaural conversion equal to or larger than 0 only when the monaural level of the input signal becomes 0.5 or smaller. For example, if a complete monaural signal of the monaural level 0 is inputted, the process strength determination part 91 outputs 0.5 to the attenuators 921 to 924 as the process strength for monaural conversion. At this time, the arbitrary level monaural conversion part 77 outputs a signal of the monaural level 0.5.

According to the control scheme as shown in FIGS. 12A and 12B, if the process strength for monaural conversion is 0, the right channel signal is Sr and the left channel signal is Sl. Therefore, the stereo signals from the AV processor 3 of FIG. 1 are provided as they are to the loudspeakers 9a and 9b. If the process strength for monaural conversion is 1, both channel signals become {(Sr+Sl)/2}. Therefore, complete monaural signals are provided to the loudspeakers 9a and 9b. In the characteristics shown in FIGS. 12A and 12B, the maximum process strength is limited to 0.5. This is because echo can be sufficiently cancelled out in practical while natural sound is ensured.

Even with the level of monaural conversion being limited, the user cannot feel a sense of stereo in the audio signals in the active state of speech recognition, even though it is a short period of time. Therefore, immediately after the use of the speech recognition function ends, the end instruction part 793 sends an end signal for the speech recognition function to the state set ting part 791. The state setting part 791 controls the switching part 78 to switch input signals to the loudspeakers 9a and 9b from outputs of the arbitrary level monaural conversion part 77 to stereo signals and to change the state of speech recognition from an active state with monaural signals at an arbitrary level being inputted to the loudspeakers 9a and 9b to a wait state with stereo signals being inputted thereto.

With this operation, echo can always be cancelled out sufficiently while stereo sound at a certain level is ensured.

As stated above, according to the present embodiment, even in the active state of speech recognition function, normal stereo signals are reproduced as they are, and only the stereo signals at a extremely low monaural level is subjected to monaural conversion. Thus, although the echo canceling effect is slightly decreased compared with those in the third embodiment, echo can be cancelled out always at a certain level or more, and deterioration in stereo sound can be reduced to a considerable degree.

Fifth Embodiment

Figure 13:
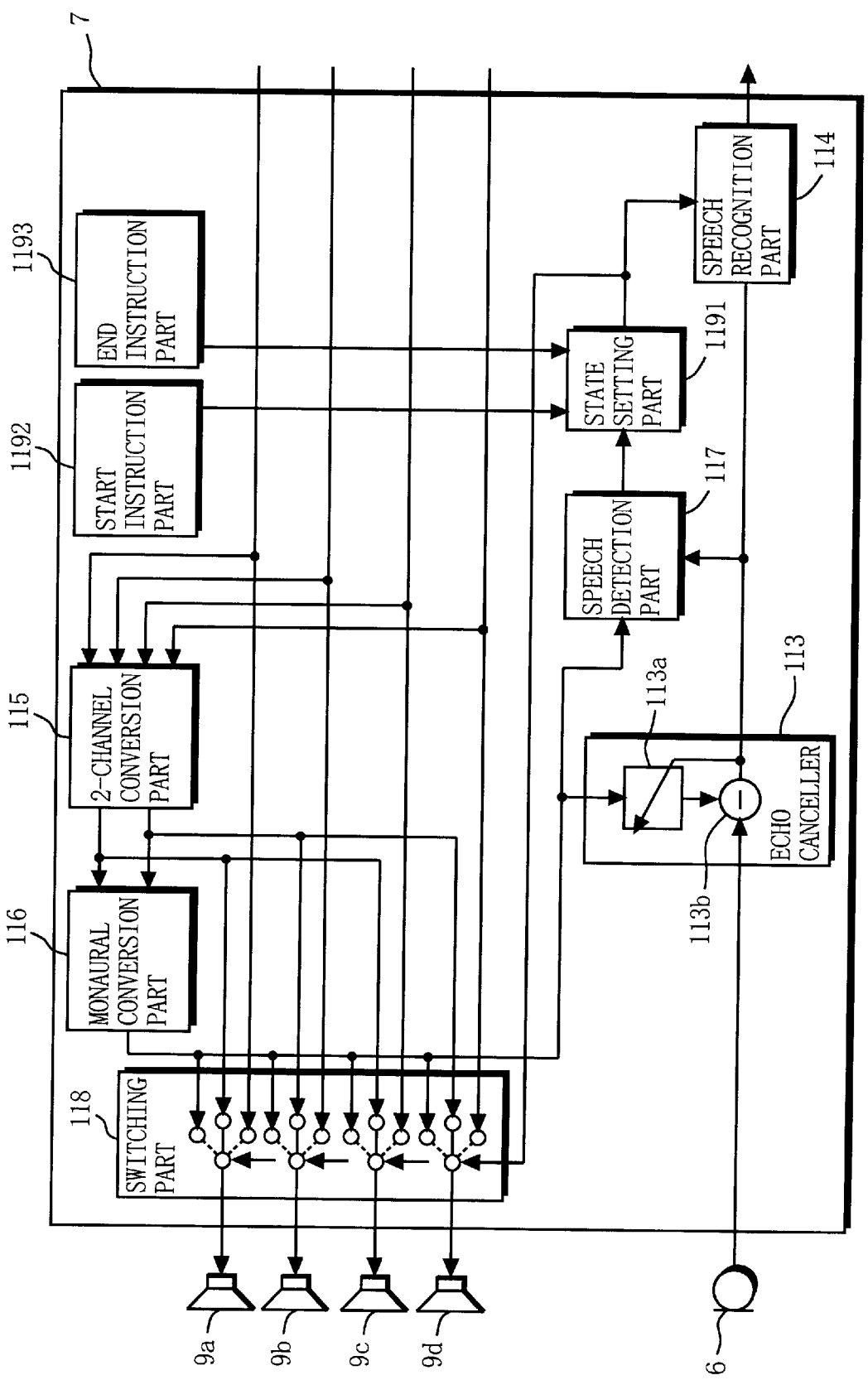
FIG. 13 is a block diagram showing the structure of a speech recognition apparatus for AV equipment according to a fifth embodiment of the present invention.

FIG. 13 is a block diagram showing the structure of a speech recognition apparatus for AV equipment according to a fifth embodiment of the present invention. In FIG. 13, components corresponding to those in FIG. 1 are provided with the same reference numerals. In the present embodiment, however, assume that, in the AV equipment, 4-channel signals are outputted from the AV processor 3 and 4-channel sound is produced through four loudspeakers 9a to 9d included in the loudspeaker unit 9.

In FIG. 13, the speech recognition apparatus 7 includes a 2-channel conversion part 115, a monaural conversion part 116, a single echo canceller 113, a speech recognition part 114, a start instruction part 1192, an end instruction part 1193, a speech detection part 117, a state setting part 1191, and a switching part 118. That is, the speech recognition apparatus 7 of FIG. 13 equals in structure to the speech recognition apparatus 7 of FIG. 7 (third embodiment) with the switching part 118 that switches among three options instead of the switching part 56 that switches between two options, the 2-channel conversion part 115, and the speech detection part 117. The speech detection part 117 is the same as the speech detection part 37 of FIG. 5 (refer to the second embodiment). The signals provided to the loudspeakers 9a to 9d are 4-channel signals outputted from the AV processor 3 of FIG. 1.

The 4-channel signals transmitted toward the loudspeakers 9a to 9d are branched to the 2-channel conversion part 115. The 2-channel conversion part 115 converts these 4-channel signals into 2-channel signals. The outputs from the 2-channel conversion part 115 (2-channel signals) are provided to the monaural conversion part 116. The monaural conversion part 116 converts these 2-channel signals into monaural signals.

A signal outputted from the microphone 6 (microphone output) and a signal outputted from the monaural conversion part 116 (monaural signal) are provided to the echo canceller 113. The echo canceller 113 extracts only the signal that corresponds to user's speech from the microphone output. Note that the operational principle of the echo canceller 113 has been described in the first embodiment.

The start instruction part 1192 instructs a start of speech recognition operation. The end instruction part 1193 instructs an end of speech recognition operation. Responsive to the instruction from the start instruction part 1192 or the end instruction part 1193, the state setting part 1191 sets the operating state of the speech recognition part 114 (that is, sets the speech recognition operation ON/OFF).

The speech detection part 117 is provided with an output from the monaural conversion part 116 (monaural signal) and an output from the echo canceller 113 (user's speech). The speech detection part 117 then detects the user's speech based on the ratio in level between these outputs.

The switching part 118 is provided with the signals outputted from the monaural conversion part 116 (monaural signals), the signals outputted from the 2-channel conversion part 115 (2-channel signals), and the 4-channel signals from the AV processor 3 of FIG. 1. When the state setting part 1191 sets the speech recognition operation ON, the switching part 118 switches inputs to the loudspeakers 9a to 9d from the 4-channel signals (in the OFF state) to the 2-channel signals. Further, in this ON state, when the speech detection part 117 detects user's speech, the switching part 118 switches from the 2-channel signals (in the ON state) to the monaural signals. On the other hand, when the state setting part 1191 sets the speech recognition operation OFF, the switching part 118 switches from the 2-channel signals or the monaural signals (in the ON state) to the 4-channel signals.

The speech recognition part 114 executes speech recognition based on the setting by the state setting part 1191. That is, the speech recognition part 114 recognizes user's speech from the echo canceller 113, and generates a control signal indicating a control specified by the speech. The generated control signal is forwarded to the controller 4 of FIG. 1. The controller 4 controls the receiver 2 and AV processor 3 to execute switching among the receiving channels and other processing in the television receiver.

The hardware structure of the speech recognition apparatus 7 of FIG. 13 is similar to that of FIG. 3. In FIG. 3, a predetermined program is previously stored in the ROM 12. In addition to the algorithms (a) to (c) as stated in the first embodiment, the algorithms (d) and (e) as stated in the second embodiment (note that, however, the number of options to be switched differs in the present embodiment), and the algorithm (f) as stated in the third embodiment, (i) an algorithm for converting 4-channel signals to 2-channel signals is further written in the program. The CPU 10 operates according to the above program while using the RAM 11 as a work area. With such structure, the function of each block shown in FIG. 13 is achieved.

Note that the start instruction part 1192 and the end instruction part 1193 are implemented as the buttons composing the control panel of FIG. 1. Moreover, the function of each block other than the start instruction part 1192 and the end instruction part 1193 can also be achieved by each dedicated piece of hardware instead of software.

The operation of the above-structured speech recognition apparatus for AV equipment 7 is now described below.

In 4-channel stereo, sound creation is characterized by localizing sounds at 360 degrees, and thus the correlation among channels is very weak. Therefore, to reproduce sounds based on 4-channel stereo signals through four loudspeakers 9a to 9d included in the loudspeaker unit 9 of FIG. 1, the speech recognition apparatus 7 of FIG. 2 cannot sufficiently cancel out echo, and as a result, often fails to carry out accurate speech recognition. For this reason, it has been considered herein that, as the speech recognition apparatuses 7 of FIGS. 5, 7, and 9, sound from the loudspeakers 9a to 9d is converted into monaural only when speech recognition operation is active or when the user makes a speech for ensuring required echo cancellation.

However, if the 4-channel stereo signals are directly converted into a monaural signal for the user to listen, the user would be very unsatisfied due to loss of a sense of stereo (stereognostic sense). Therefore, in the present embodiment, in the active state of speech recognition, 4-channel signals are converted into 2-channel signals and 2-channel stereo audio is provided to the user. Moreover, in this active state, monaural sound is provided to the user only when the user makes a speech. This can ensure sufficient echo cancellation while reasonably-good stereo sense is kept.

In FIG. 13, from the inputted 4-channel signals, 2-channel signals are generated by the 2-channel conversion part 115, and monaural signal is generated by the monaural conversion part 116. The echo canceller 113 is always provided with the monaural signal. In a wait state where the speech recognition is not utilized, 4-channel signals are provided to the loudspeakers 9a to 9d.

To utilize the speech recognition function, the start instruction part 1192 of FIG. 11 sends a signal for starting the speech recognition function to the state setting part 1191. The start setting part 1191 controls the switching part 118 to switch signals to be inputted to the loudspeakers 9a to 9d from 4-channel to 2-channel, and changes the state of speech recognition from a wait state with 2-channel signals being inputted to the loudspeakers 9a to 9d to an active state with 4-channel signals being inputted thereto. Conversion from 4-channel to 2-channel can be made by adding signals of forward- and backward-right channels together to produce a right-channel signal and adding signals of forward-and backward-left channels together to produce a left-channel signal. Conversion to monaural can be made by adding the above four channel signals together or by adding two left and right 2-channel signals.

In the active state, the speech detection part 117 monitors the level of the monaural signal and the echo canceller output signal. If the echo canceller output signal is increased in level more than a level expected from the monaural signal, the speech detection part 117 determines that the user made a speech. Then, the switching part 118 switches inputs to the loudspeakers 9a to 9d from 2-channel signals to monaural signals.

As stated above, according to the present embodiment, a reproduction mode is switched stepwise such as 4-channel reproduction when the speech recognition function is not used; 2-channel reproduction when the speech recognition function is active; and monaural reproduction when speech is inputted. With this switching, reasonably-good stereo sense can be ensured even in a wait state, and sufficient echo cancellation can also be achieved.

Sixth Embodiment

Figure 14:
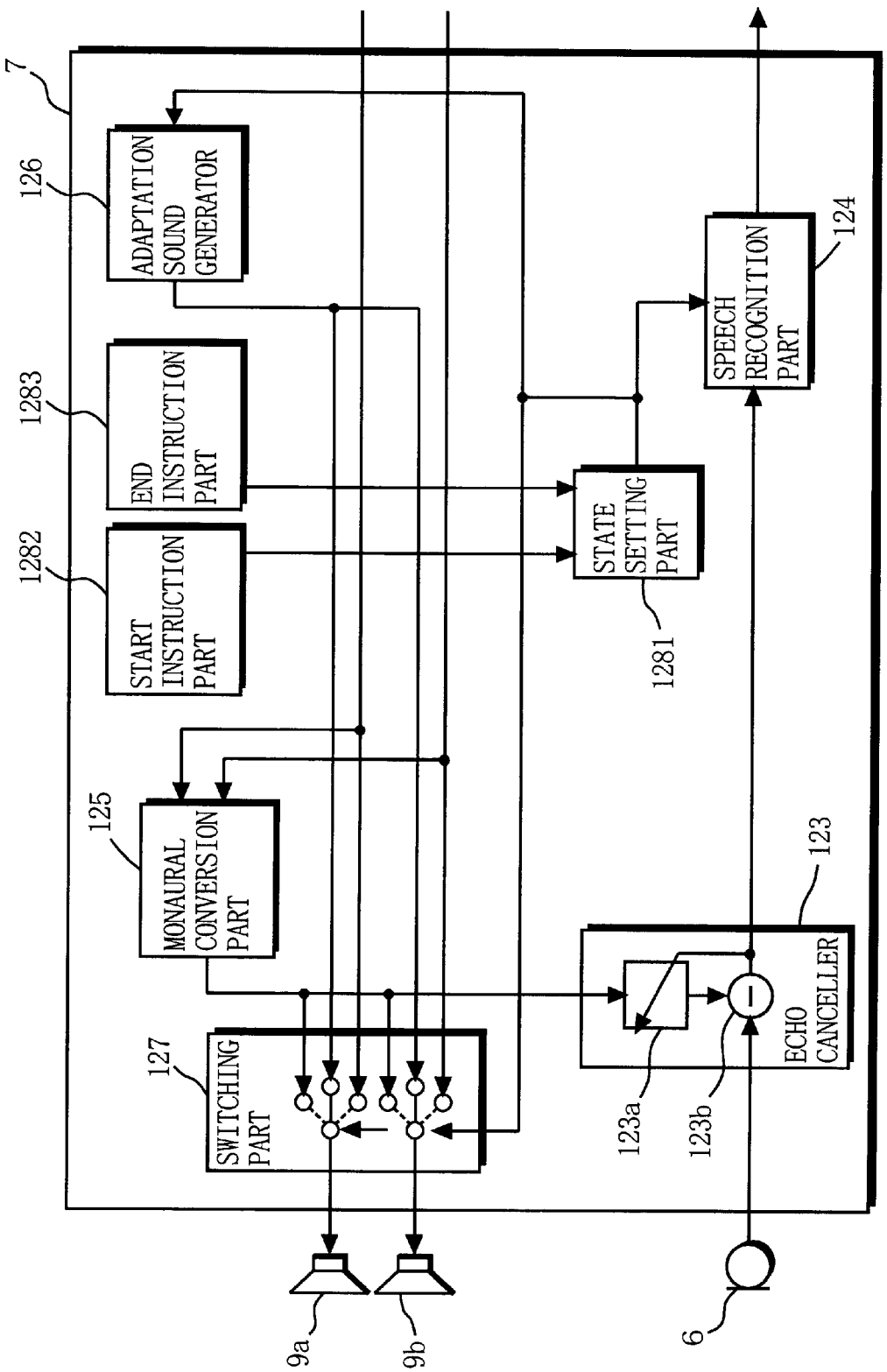
FIG. 14 is a block diagram showing the structure of a speech recognition apparatus for AV equipment according to a sixth embodiment of the present invention.

FIG. 14 is a block diagram showing the structure of a speech recognition apparatus for AV equipment according to a sixth embodiment of the present invention. In FIG. 14, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 14, the speech recognition apparatus 7 includes a monaural conversion part 125, a single echo canceller 123, a speech recognition part 124, a start instruction part 1282, an end instruction part 1283, a state setting part 1281, a switching part 127, an adaptation sound generation part 126. That is, the speech recognition apparatus 7 of FIG. 14 equals in structure to the speech recognition apparatus 7 of FIG. 7 (third embodiment) with the the adaptation sound generation part 126 added thereto. The signals provided to the loudspeakers 9a and 9b are 2-channel signals outputted from the AV processor 3 of FIG. 1.

The adaptation sound generation part 126 generates monaural sound in relation to the setting by the state setting part 1281. In other words, the state setting part 1281 sets the speech recognition operation from an OFF to ON state, and in response thereto, the adaptation sound generation part 126 generates monaural adaptation sound.

This adaptation sound accelerates the adaptive operation of the echo canceller 123. More specifically, with the transition of the speech recognition operation from an OFF to ON state, outputs from the loudspeakers 9a and 9b are switched from 2-channel audio to monaural audio. If the output level of the loudspeakers 9a and 9b immediately after this switching equals to or approximately equals to 0 (i.e., no sound), adaptation from 2-channel to monaural does not proceed in a digital filter 123a of the echo canceller 123.

At this time, if high-level monaural sound is abruptly produced from the loudspeakers 9a and 9b, the echo canceller 123 cannot cancel out the sound. As a result, echo sound is mixed into the speech recognition part 124. This may prevent accurate recognition of user's speech. Therefore, when the speech recognition operation makes an OFF to ON transition, monaural adaptation sound is produced from the loudspeakers 9a and 9b to forcefully adapt the digital filter 123a to monaural.

The operations of the components other than the adaptation sound generation part 126 are similar to those in the third embodiment. Therefore, their description is omitted herein.

The hardware structure of the speech recognition apparatus 7 of FIG. 14 is similar to that of FIG. 3. In FIG. 3, a predetermined program is previously stored in the ROM 12. In addition to the algorithms (a) to (c) as stated in the first embodiment, the algorithm (e) as stated in the second embodiment, and the algorithm (f) as stated in the third embodiment, (j) an algorithm for generating adaptation sound is further written in the program. The CPU 10 operates according to the above program while using the RAM 11 as a work area. With such structure, the function of each block shown in FIG. 14 is achieved.

Note that the start instruction part 1282 and the end instruction part 1283 are implemented as the buttons composing the control panel of FIG. 1. Moreover, the function of each block other than the start instruction part 1282 and the end instruction part 1283 can also be achieved by each dedicated piece of hardware instead of software.

The operation of the above-structured speech recognition apparatus for AV equipment 7 is now described below.

The speech recognition apparatus 7 of FIG. 14 solves the drawback of the speech recognition apparatus 7 of FIG. 7 that echo cancellation by the echo canceller 54 is not sufficient immediately after speech recognition makes a transition from a wait to active state.

In the speech recognition apparatus 7 of FIG. 7, in the wait state of speech recognition, stereo signals are provided to the loudspeakers 9a and 9b and a monaural signal is provided to the echo canceller 54. Therefore, the echo canceller 54 is not adapted sufficiently enough to carry out complete echo cancellation. In the speech recognition apparatus 7 of FIG. 7, for utilizing the speech recognition function, by switching input signals to the loudspeakers 9a and 9b to monaural signals in the active state, the echo canceller 54 is made sufficiently adaptive to carry out complete echo cancellation. Even with this, however, adaptation of the echo canceller 54 does not proceed unless any sound is produced from the loudspeakers 9a and 9b. Therefore, if no sound continues immediately after the switching and sound is finally started to be produced from the loudspeakers 9a and 9b while the user inputs speech, echo sound from the loudspeakers 9a and 9b cannot be sufficiently cancelled out.

Therefore, the speech recognition apparatus 7 of FIG. 14 is structured as such that, immediately after the transition from a wait to active state, the adaptation sound generation part 126 provides the loud speakers 9a and 9b with monaural adaptation sound for accelerating adaptation of the echo canceller 123 for several seconds. As the adaptation sound, synthesis voice such as "please enter a speech input" can be thought.

As stated above, according to the present embodiment, monaural adaptation sound is produced from the loudspeakers 9a and 9b immediately after a transition from a wait to active state. Therefore, sufficient echo cancellation can be ensured even immediately after the transition.

Seventh Embodiment

Figure 15:
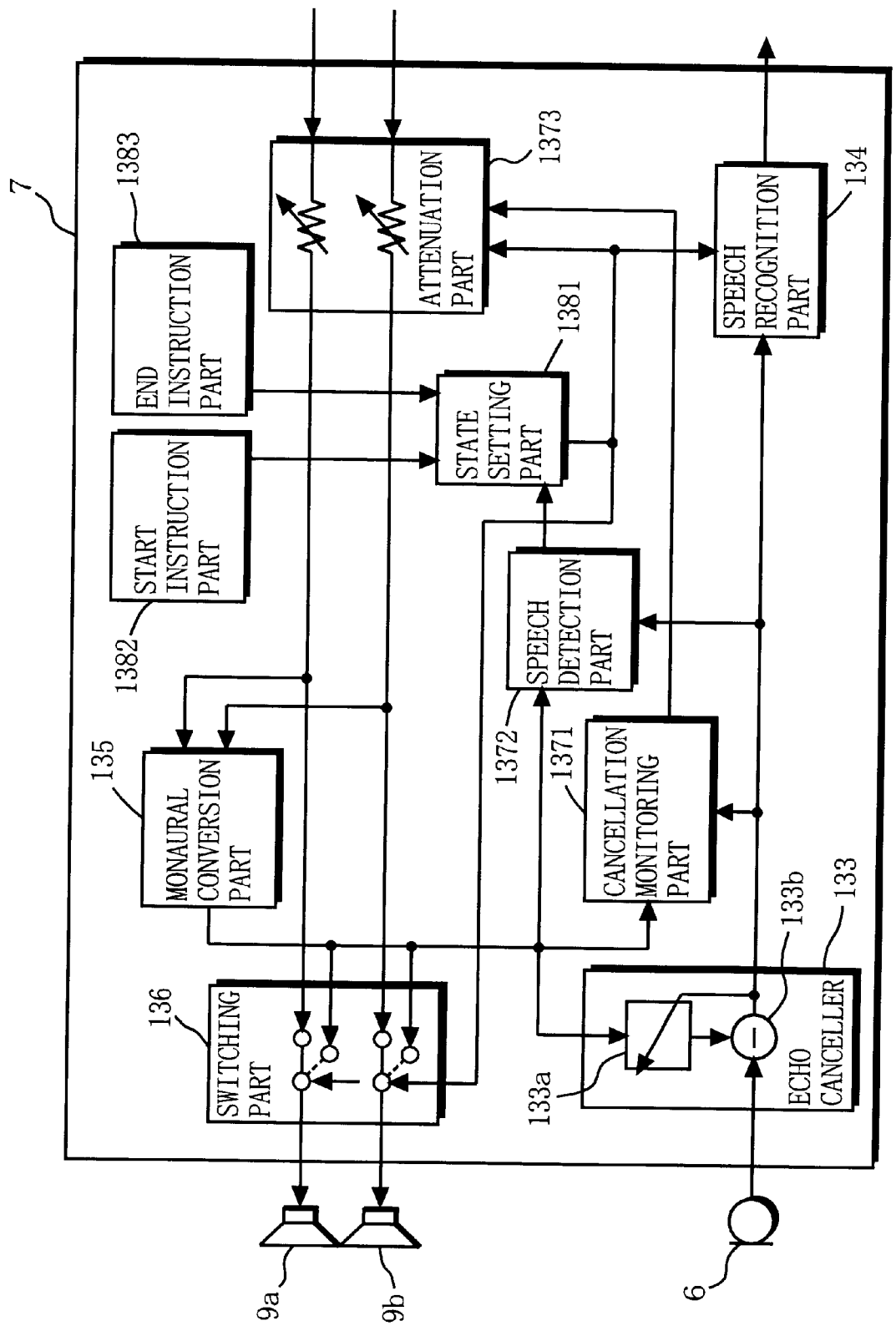
FIG. 15 is a block diagram showing the structure of a speech recognition apparatus for AV equipment according to a seventh embodiment of the present invention.

FIG. 15 is a block diagram showing the structure of a speech recognition apparatus for AV equipment according to a seventh embodiment of the present invention. In FIG. 15, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 15, the speech recognition apparatus 7 includes a monaural conversion part 135, a single echo canceller 133, a speech recognition part 134, a start instruction part 1382, an end instruction part 1383, a state setting part 1381, a switching part 136, a cancellation monitoring part 1371 a speech detection part 1372, and an attenuation part 1373. That is, the speech recognition apparatus 7 of FIG. 15 equals in structure to the speech recognition apparatus 7 of FIG. 7 (third embodiment) with the cancellation monitoring part 1371 the speech detection part 1372, and the attenuation part 1373 added thereto. The signals provided to the loudspeakers 9a and 9b are 2-channel signals outputted from the AV processor 3 of FIG. 1.

The cancellation monitoring part 1371 is provided with an output from the monaural conversion part 135 (monaural signal) and an output from the echo canceller 133 (user's speech). The cancellation monitoring part 1371 then monitors fluctuation in level of each output to determine whether echo sound is sufficiently cancelled out in the echo canceller 133 or not (that is, a digital filter 133a is being sufficiently adapted to monaural or not). In other words, if the user's speech surges in level as the monaural signal does, echo sound has not been sufficiently cancelled out yet. In reverse, if the user's speech surges little, echo sound has been sufficiently cancelled out.

The attenuation part 1373 attenuates 2-channel signals received from the AV processor 3 of FIG. 1 in relation to the monitoring results of the cancellation monitoring part 1371 and the setting of the state setting part 1381. In other words, with echo sound not being sufficiently cancelled out in the echo canceller 133, when the state setting part 1381 sets the speech recognition operation from an OFF to ON state, the attenuation part 1373 temporarily attenuates these 2-channel signals.

If the 2-channel signals are attenuated in the above-described manner, echo sound can be prevented from being mixed into the speech recognition part 134. More specifically, with a transition of the speech recognition operation from an OFF to ON state, outputs from the loudspeakers 9a and 9b are switched from 2-channel audio to monaural audio. If the output level of the loudspeakers 9a and 9b immediately after this switching equal to or approximately equal to 0 (i.e., no sound), adaptation from 2-channel to monaural does not proceed in the digital filter 133a of the echo canceller 133.

At this time, if high-level monaural sound is abruptly produced from the loudspeakers 9a and 9b, the echo canceller 133 cannot cancel out the sound. Therefore, with echo sound not being sufficiently cancelled out, when the speech recognition operation makes a transition from an OFF to ON state, the monaural signals outputted from the loudspeakers 9a and 9b are reduced in level, thereby preventing echo sound from being mixed into the speech recognition part 134.

The operations of the components other than the cancellation monitoring part 1371, the speech detection part 1372, and the attenuation part 1373 are similar to those in the third embodiment. Therefore, their description is omitted herein.

The hardware structure of the speech recognition apparatus 7 of FIG. 15 is similar to that of FIG. 3. In FIG. 3, a predetermined program is previously stored in the ROM 12. In addition to the algorithms (a) to (c) as stated in the first embodiment, the algorithm (e) as stated in the second embodiment, and the algorithm (f) as stated in the third embodiment, (k) an algorithm for monitoring whether echo sound is sufficiently cancelled out and (l) an algorithm for attenuating 2-channel signals to the loudspeakers are further written in the program. The CPU 10 operates according to the above program while using the RAM 11 as a work area. With such structure, the function of each block shown in FIG. 15 is achieved.

Note that the start instruction part 1382 and the end instruction part 1383 are implemented as the buttons composing the control panel of FIG. 1. Moreover, the function of each block other than the start instruction part 1382 and the end instruction part 1383 can also be achieved by each dedicated piece of hardware instead of software.

The operation of the above-structured speech recognition apparatus for AV equipment 7 is now described below.

Similarly to the speech recognition apparatus 7 of FIG. 14, the speech recognition apparatus 7 of FIG. 15 solves the drawback of the speech recognition apparatus 7 of FIG. 7 that echo cancellation by the echo canceller 54 is not sufficient immediately after speech recognition makes a transition from a wait to active state.

As stated above, the speech recognition apparatus 7 of FIG. 15 is provided with the cancellation monitoring part 1371 for monitoring output signals from the monaural conversion part 135 and from the echo canceller 133 in level to determine whether echo sound is sufficiently cancelled out or not; the speech detection part 1372 for monitoring the output signals from the monaural conversion part 135 and from the echo canceller 133 in level to determine whether the user made a speech; and the attenuation part 1373 for attenuating input signals to the loudspeakers 9a and 9b. Immediately after the transition from a wait to active state, the echo canceller 133 is not sufficiently adapted, and accordingly, the echo cancellation effect therein is not enough yet. Assume that no sound is provided to the loudspeakers 9a and 9b immediately after the transition; the user makes a speech before the echo canceller 133 is adapted; and then sound is finally started to be produced from the loudspeakers 9a and 9b while the user inputs speech. In this case, the echo canceller 133 cannot sufficiently cancel out echo sound from the loudspeakers 9a and 9b. Consequently, echo sound from the loudspeakers 9a and 9b is mixed into the speech to the speech recognition part 134.

Therefore, in the present embodiment, the speech detection part 1372 and the attenuation part 1373 are provided. With no sound continuing in the monaural signals, if the cancellation monitoring part 1371 determines that echo sound is not sufficiently cancelled out by the echo canceller 133 and also the speech detection part 1372 detects user's speech, the attenuation part 1373 attenuates the input signals to the loudspeakers 9a and 9b. With this attenuation, echo sound that is mixed into the user's speech is reduced. If a transition is made from no sound to sound in the monaural signals to the loudspeakers 9a and 9b, the attenuation in the attenuation part 1373 is taken as 0, and the monaural sound outputted from the loudspeakers 9a and 9b are used as adaptation sound for accelerating the adaptation of the echo canceller 133. If the echo canceller 133 becomes so adapted as to reduce a residual echo, the attenuation is controlled to be 0 also at detection of speech.

As stated above, according to the present embodiment, with insufficient echo cancellation immediately after the transition from a wait (OFF in speech recognition operation) to active (ON) state, when user's speech is detected, the input signals to the loudspeaker 9a and 9b are appropriately attenuated, thereby preventing the mixing of echo sound. Therefore, speech recognition performance with insufficient echo cancellation can be increased.

Eighth Embodiment

Figure 16:
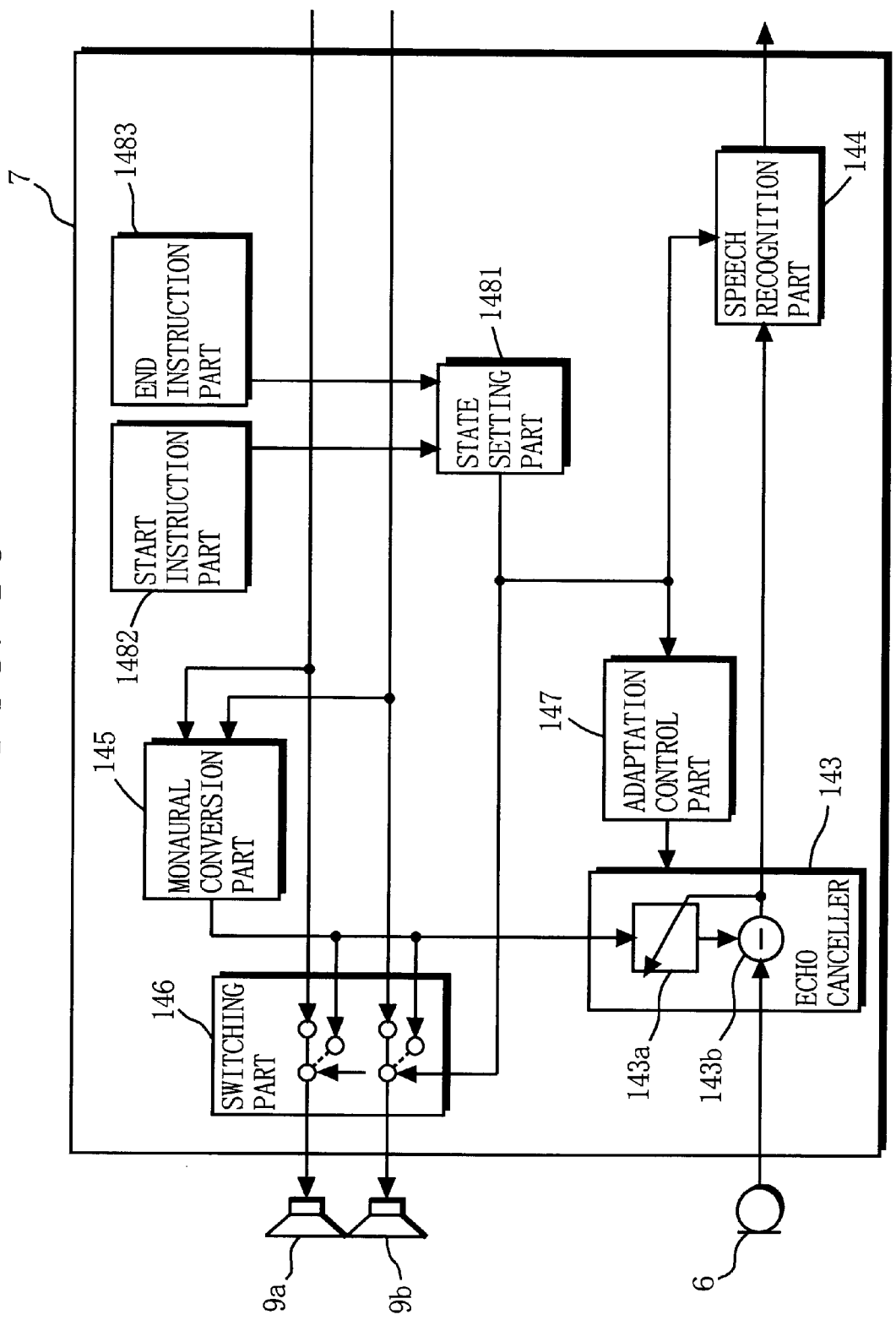
FIG. 16 is a block diagram showing the structure of a speech recognition apparatus for AV equipment according to an eighth embodiment of the present invention.

FIG. 16 is a block diagram showing the structure of a speech recognition apparatus for AV equipment according to an eighth embodiment of the present invention. In FIG. 16, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 16, the speech recognition apparatus 7 includes a monaural conversion part 145, a single echo canceller 143, a speech recognition part 144, a start instruction part 1482, an end instruction part 1483, a state setting part 1481, a switching part 146, and an adaptation control part 147. That is, the speech recognition apparatus 7 of FIG. 16 equals in structure to the speech recognition apparatus 7 of FIG. 7 (third embodiment) with the adaptation control part 147 added thereto. The signals provided to the loudspeakers 9a and 9b are 2-channel signals outputted from the AV processor 3 of FIG. 1.

The adaptation control part 147 controls, in relation to the setting of the state setting part 1481, an adaptation speed of an adaptive digital filter 143a in the echo canceller 143. More specifically, the digital filter 143a can change the adaptation speed for the input signal. In the adaptation control part 147, a high adaptation speed for monaural and a low adaptation speed for 2-channel are stored in advance. When the state setting part 1481 sets the speech recognition operation from an OFF to ON state (accordingly, loudspeaker outputs are changed from 2-channel to monaural sound), the adaptation control part 147 changes the adaptation speed of the digital filter 143a from high to low. Further, with a transition of speech recognition operation from an ON to OFF state, the adaptation control part 147 changes the adaptation speed of the digital filter 143a from low to high.

The operations of the components other than the adaptation control part 147 are similar to those in the third embodiment. Therefore, their description is omitted herein.

The hardware structure of the speech recognition apparatus 7 of FIG. 16 is similar to that of FIG. 3. In FIG. 3, a predetermined program is previously stored in the ROM 12. In addition to the algorithms (a) to (c) as stated in the first embodiment, the algorithm (e) as stated in the second embodiment, and the algorithm (f) as stated in the third embodiment, (m) an algorithm for controlling the adaptation speed of the echo canceller is further written in the program. The CPU 10 operates according to the above program while using the RAM 11 as a work area. With such structure, the function of each block shown in FIG. 16 is achieved.

Note that the start instruction part 1482 and the end instruction part 1483 are implemented as the buttons composing the control panel of FIG. 1. Moreover, the function of each block other than the start instruction part 1482 and the end instruction part 1483 can also be achieved by each dedicated piece of hardware instead of software.

The operation of the above-structured speech recognition apparatus for AV equipment 7 is now described below.

As is well known, adaptation of the echo canceller 143 is made by sequentially correcting an estimated impulse response so that an output from the echo canceller 143 becomes 0. The impulse response in a system (echo path) between the loudspeakers 9a and 9b and the microphone 6 varies with time by furniture, persons, windows, curtains, etc., in a room. Therefore, satisfactory cancellation cannot be achieved without adaptive operation. However, if a signal that cannot be eliminated even by correcting the impulse response (noise, for example) is included in the input signal to the echo canceller 143, an error occurs in the estimated impulse response to reduce echo cancellation.

In sequential correction of the estimated impulse response, the adaptation speed can be controlled by varying the amount of correction at a time. The larger the amount of correction at a time, the higher the adaptation speed; and the smaller, the lower. A higher adaptation speed brings higher resistance to fluctuations in system (i.e., it is possible to follow the impulse response fluctuations in the echo path more quickly), but lower to noise (i.e., adaptive operation is more likely to be unstable with noise). On the contrary, a lower adaptation speed brings lower resistance to fluctuations in system, but higher to noise. Therefore, in actual apparatuses, the adaptation speed has been selected so that the quick following to fluctuation in system and noise-resistance can both be satisfied to some extent.

In the speech recognition apparatus 7 of FIG. 7, in an active state of speech recognition, monaural sound is produced from the loudspeakers 9a and 9b, and the echo of that monaural sound is cancelled out with a monaural signal. Therefore, speech recognition can be carried out satisfactorily even with a relatively high adaptation speed. In a wait state, however, the echo of stereo sound is to be cancelled out with the monaural signal. In this case, if the same adaptation speed as that in the active state is applied, an error included in the estimated impulse response becomes extremely large. The echo canceller 143 repeatedly performs adaptive operation so as to cancel out signal components that cannot be cancelled out in principle. Consequently, the estimated impulse response is damaged. As such, with poor adaptive performance during a wait state, the speech recognition apparatus 7 of FIG. 7 performs echo cancellation only in an extremely small amount, immediately after the transition from a wait to active state.

Therefore, in the speech recognition apparatus of FIG. 16, the adaptation control part 147 for controlling the adaptation speed of the echo canceller 143 is provided to carry out sufficient echo cancellation immediately after the transition from a wait to active state.

The adaptation control part 147 sets the adaptation speed varying between the wait state with stereo signals being inputted to the loudspeakers 9a and 9b and the active state with monaural signals being inputted thereto.

More specifically, in the wait state, the adaptation control part 147 reduces the adaptation speed to ensure estimation accuracy in impulse response. On the other hand, in the active state, the adaptation control part 147 increases the adaptation speed to ensure a sufficient echo cancellation effect even immediately after the transition from the wait to active state.

As stated above, according to the present embodiment, the adaptation speed of the adaptive digital filer 143a in the echo canceller 143 is controlled to be increased when the speech recognition part 144 is set in the active state, while being decreased when set in the wait state. Consequently, monaural and multichannel echo cancellation can be appropriately carried out.

In other words, when multichannel sound is produced from the loudspeakers 9a and 9b, many stereo components, which are noise for the adaptive digital filter 143, are present therein. Therefore, with a low adaptation speed, noise-resistance is increased. On the other hand, when monaural sound is produced, no stereo components are present therein. Therefore, with a high adaptation speed, fluctuations in impulse response on the echo path can be followed more.

Furthermore, as stated above, the adaptation speed of the echo canceller 143 is varied with the state of the speech recognition operation. Therefore, an excellent echo canceling effect can be achieved even immediately after the transition from a wait to active state.

Ninth Embodiment

Figure 17:
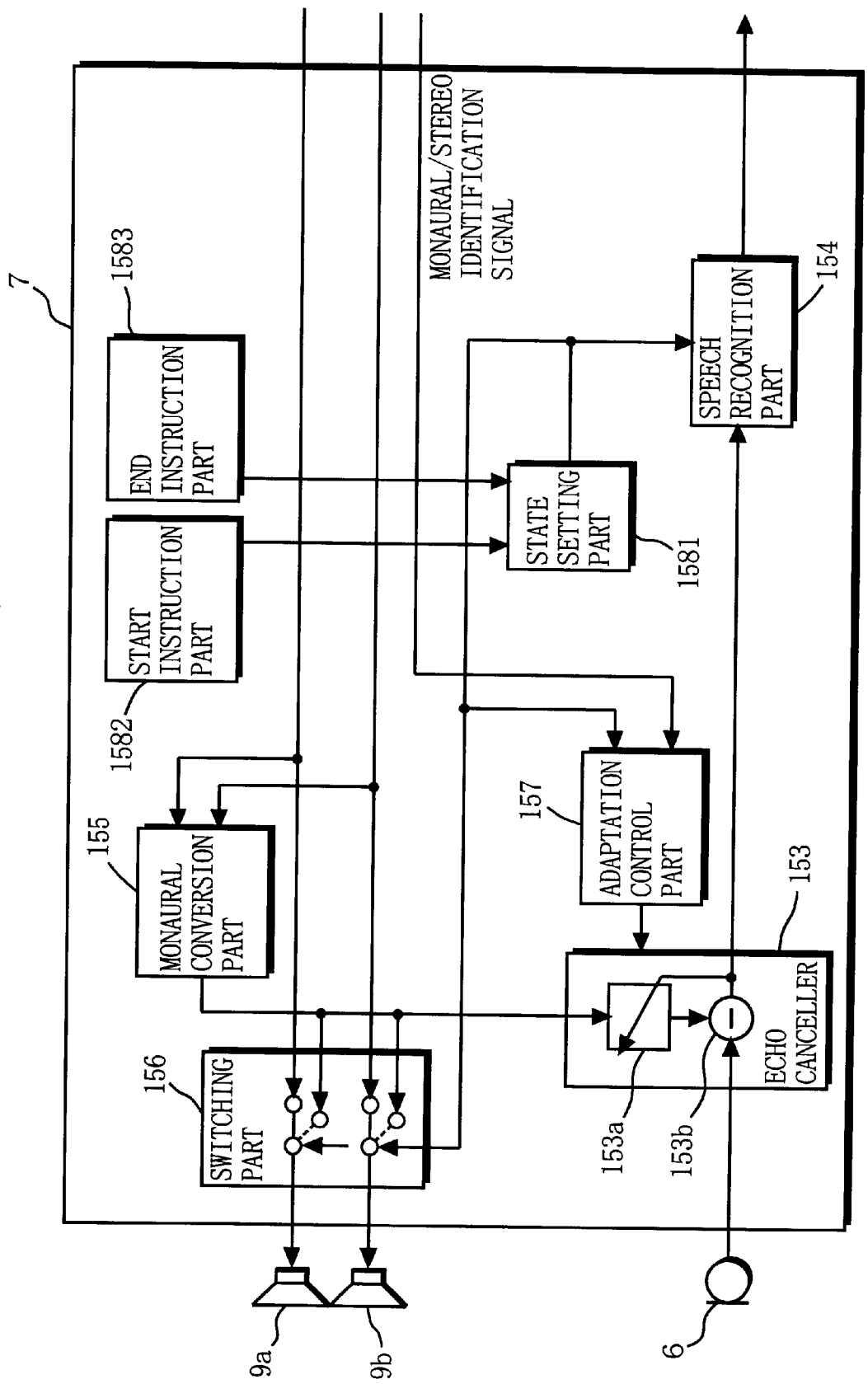
FIG. 17 is a block diagram showing the structure of a speech recognition apparatus for AV equipment according to a ninth embodiment of the present invention.

FIG. 17 is a block diagram showing the structure of a speech recognition apparatus for AV equipment according to a ninth embodiment of the present invention. In FIG. 17, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 17, the speech recognition apparatus 7 includes a monaural conversion part 155, a single echo canceller 153, a speech recognition part 154, a start instruction part 1582, an end instruction part 1583, a state setting part 1581, a switching part 156, and an adaptation control part 157. That is, the speech recognition apparatus 7 of FIG. 17 equals in structure to the speech recognition apparatus 7 of FIG. 16 (eight embodiment). The difference is that 2-channel (stereo) or monaural acoustic signal is outputted from the AV processor 3 of FIG. 1 and a monaural/stereo identification signal is further provided to the adaptation control part 157 by the AV processor 3 of FIG. 1. The signals provided to the loudspeakers 9a and 9b are 2-channel or monaural signals outputted from the AV processor 3 of FIG. 1.

The adaptation control part 157 controls, in relation to the setting of the state setting part 1581 and the monaural/stereo identification signal, an adaptation speed of an adaptive digital filter 153a in the echo canceller 153. More specifically, the digital filter 153a can change the adaptation speed for the input signal. In the adaptation control part 157, a high adaptation speed for monaural and a low adaptation speed for 2-channel are stored in advance. When the state setting part 1581 sets the speech recognition operation from an OFF to ON state (accordingly, loudspeaker outputs are changed from 2-channel to monaural sound), the adaptation control part 157 changes the adaptation speed of the digital filter 153a from high to low. Further, with a transition of speech recognition operation from an ON to OFF state, the adaptation control part 157 changes the adaptation speed of the digital filter 153a from low to high.

However, the adaptation control part 157 changes the adaptation speed in the above-described manner only when the monaural/stereo identification signal indicates stereo. When monaural is indicated, the adaptation speed of the digital filter 153a is made high, irrespectively of the setting of the state setting part 1581.

The operations of the components other than the adaptation control part 157 are similar to those in the eighth embodiment. Therefore, their description is omitted herein.

The hardware structure of the speech recognition apparatus 7 of FIG. 17 is similar to that of FIG. 3. In FIG. 3, a predetermined program stored in the ROM 12 is similar to that in the eighth embodiment. In the algorithm (m) for controlling the adaptation speed of the echo canceller, however, a change is made so that the adaptation speed is controlled by referring not only the ON/OFF state of the speech recognition operation but also the monaural/stereo identification signal. The CPU 10 operates according to the above program while using the RAM 11 as a work area. With such structure, the function of each block shown in FIG. 17 is achieved.

Note that the start instruction part 1582 and the end instruction part 1583 are implemented as the buttons composing the control panel of FIG. 1. Moreover, the function of each block other than the start instruction part 1582 and the end instruction part 1583 can also be achieved by each dedicated piece of hardware instead of software.

The operation of the above-structured speech recognition apparatus for AV equipment 7 is now described below.

General TV broadcasting includes two types of program: stereo and monaural. Together with video/acoustic signals, the identification signal for identifying either stereo or monaural program is broadcast. This identification signal allows the receiving side to know the present program is either stereo or monaural.

In the speech recognition apparatus 7 of FIG. 16, irrespectively of whether the program being received is stereo or monaural, the adaptation speed of the echo canceller 153 is always reduced in the wait state with the signals processed in the monaural conversion part 155 not being provided to the loudspeakers 9a and 9b. However, even in the wait state, it is preferable, as a matter of course, not to reduce the adaptation speed.

With the adaptation speed reduced, the echo canceller 153 is likely not to follow fluctuations in system. In that state, if a transition is made to active, sufficient echo cancellation cannot be achieved. On the other hand, with the adaptation speed not reduced even in the wait state, the echo canceller 153 always follows fluctuations in system. Therefore, whenever a transition is made to active, sufficient echo cancellation can be ensured.

For monaural programs, the adaptation speed can be increased even in the wait state when the monaural conversion part 155 does not operate. Therefore, in the speech recognition apparatus 7 of FIG. 17, the adaptation control part 157 first checks the identification signal. As a result, if the program being received is stereo, the adaptation control part 157 reduces the adaptation speed of the echo canceller 153 in the wait state. If it is monaural, the adaptation control part 157 keeps the adaptation speed high, as in the active state, even in the wait state.

As stated above, according to the present embodiment, whether the sound of the program being received is stereo or monaural is determined based on the stereo/monaural identification signal. If monaural, the adaptation speed of the echo canceller 153 is not reduced even in the wait state of the speech recognition operation. Therefore, fluctuations in impulse response on the echo path can be followed without degradation. As a result, an excellent echo canceling effect in the wait state can be achieved, and speech recognition performance immediately after the transition to the active state can be increased.

Tenth Embodiment

Figure 18:
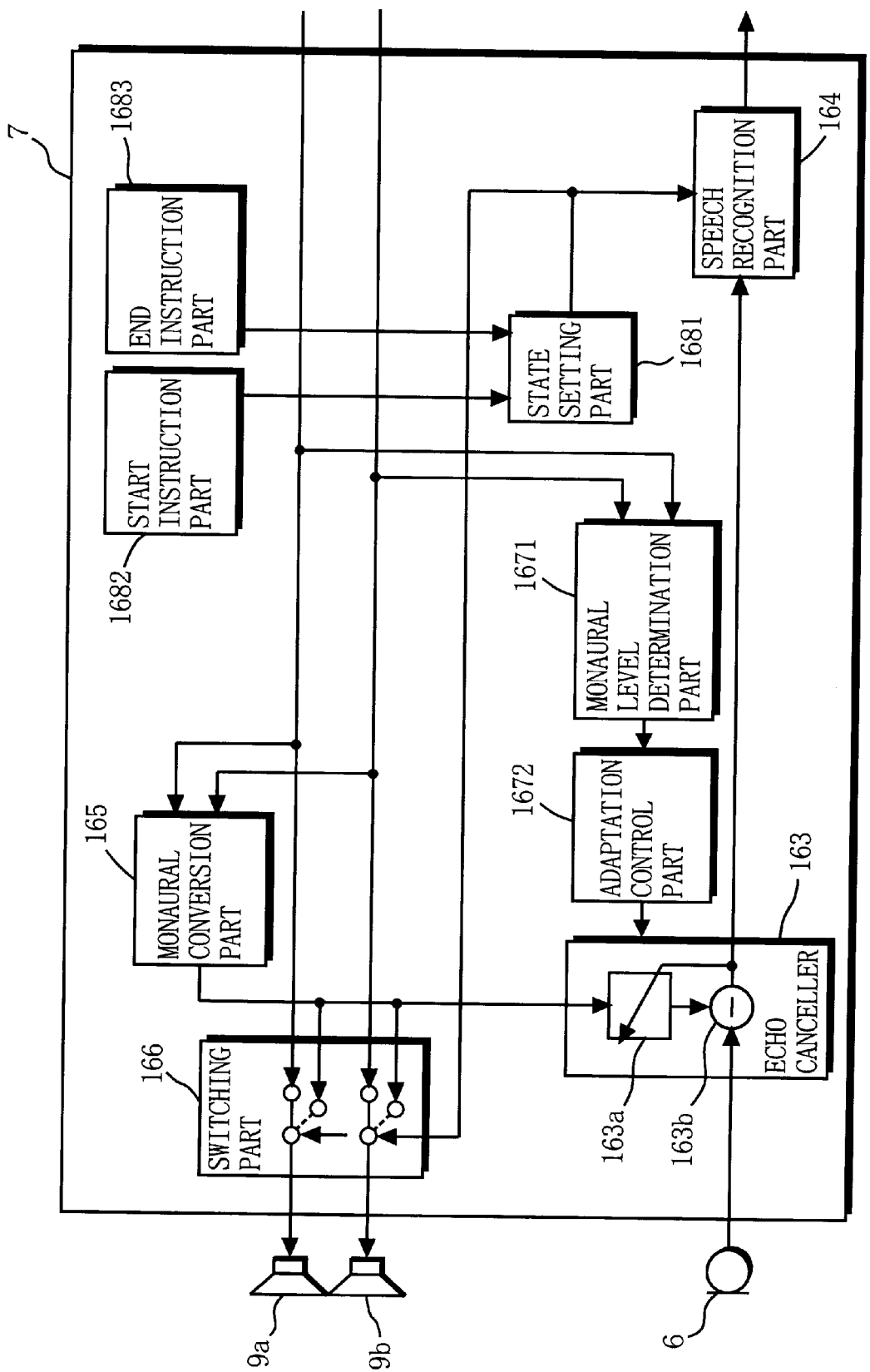
FIG. 18 is a block diagram showing the structure of a speech recognition apparatus for AV equipment according to a tenth embodiment of the present invention.

FIG. 18 is a block diagram showing the structure of a speech recognition apparatus for AV equipment according to a tenth embodiment of the present invention. In FIG. 18, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 18, the speech recognition apparatus 7 includes a monaural conversion part 165, a single echo canceller 163, a speech recognition part 164, a start instruction part 1682, an end instruction part 1683, a state setting part 1681, a switching part 166, a monaural level determination part 1671, and an adaptation control part 1672. That is, the speech recognition apparatus 7 of FIG. 18 equals in structure to the speech recognition apparatus 7 of FIG. 16 (eighth embodiment) with the monaural level determination part 1671 added thereto. The monaural level determination part 1671 is equal to the monaural level determination part 76 of FIG. 9 (refer to the fourth embodiment). The signals provided to the loudspeakers 9a and 9b are 2-channel signals outputted from the AV processor 3 of FIG. 1.

The monaural level determination part 1671 is provided with the above 2-channel signals branched. The monaural level determination part 1671 then determines the monaural level of these 2-channel signals. The adaptation control part 1672 controls, in relation to the determination result of the monaural level determination part 1671, the adaptation speed of a digital filter 163a in the echo canceller 163.

The adaptation control part 1672 changes, in relation to the monaural level of the 2-channel signals, an adaptation speed of the adaptive digital filter 163a. Preferably, as the monaural level is higher, the adaptation speed is increased more. For this purpose, stored in the adaptation control part 1672 is a function (a process strength determination characteristic 104 shown in FIG. 19) for determining at which degree of strength the adaptation speed is increased based on the monaural level.

The operations of the components other than the monaural level determination part 1671 and the adaptation control part 1672 are similar to those in the eighth embodiment. Therefore, their description is omitted herein.

The hardware structure of the speech recognition apparatus 7 of FIG. 18 is similar to that of FIG. 3. In FIG. 3, a predetermined program is previously stored in the ROM 12. In the program, the algorithms (a) to (c) as stated in the first embodiment, the algorithm (e) as stated in the second embodiment, the algorithm (f) as stated in the third embodiment, and the algorithm (g) as stated in the fourth embodiment, and the algorithm (M) as stated in the eighth embodiment are written.

In the algorithm (m) for controlling the adaptation speed of the echo canceller, however, a change is made so that the adaptation speed is controlled based on not the ON/OFF state of the speech recognition operation (eighth embodiment), but the monaural level of the 2-channel signals to the loudspeakers. The CPU 10 operates according to the above program while using the RAM 11 as a work area. With such structure, the function of each block shown in FIG. 18 is achieved.

Note that the start instruction part 1682 and the end instruction part 1683 are implemented as the buttons composing the control panel of FIG. 1. Moreover, the function of each block other than the start instruction part 1682 and the end instruction part 1683 can also be achieved by each dedicated piece of hardware instead of software.

The operation of the above-structured speech recognition apparatus for AV equipment 7 is now described below.

The speech recognition apparatus 7 of FIG. 18 solves the drawback of the speech recognition apparatus 7 of FIG. 7 that adaptive accuracy of the echo canceller 163 is degraded with a signal at a low monaural level being inputted thereto. As stated above, adaptation of the echo canceller 163 is made by sequentially correcting an estimated impulse response so that an output from the echo canceller 143 becomes 0. Therefore, if a signal that cannot be eliminated even by correcting the impulse response (noise, for example) is included in the input signal to the echo canceller 143, an error occurs in the estimated impulse response to reduce echo cancellation.

The same goes for the case where echo sound of stereo signals are to be cancelled out with monaural signals. That is, in this case, some components that cannot be eliminated anyhow even by correcting the impulse response. If such components (stereo components) are large in quantity, that is, for stereo signals at a low monaural level, the echo canceller 163 repeatedly performs adaptive operation so as to cancel out signal components that cannot be cancelled out in principle. Consequently, the estimated impulse response is seriously damaged.

Therefore, in the speech recognition apparatus 7 of FIG. 18, by analyzing the stereo signals from the AV processor 3, it is determined whether echo cancellation can be made accurately in principle and whether these signals are suitable for adaptive operation. If these signals are determined to be suitable for adaptive operation, the echo canceller 163 is made to perform adaptive operation.

In the speech recognition apparatus 7 of FIG. 18, whether the signals are suitable for adaptation is determined with the monaural level of the signals. As stated above, the higher the signal in monaural level, the more their echo cancellation effect and the better the estimation of the impulse response. Thus, the monaural level determination part 1671 first obtains the monaural level of the stereo signals. Then, the adaptation control part 1672 controls the adaptation speed of the echo canceller 163 based on the monaural level.

Figure 19:
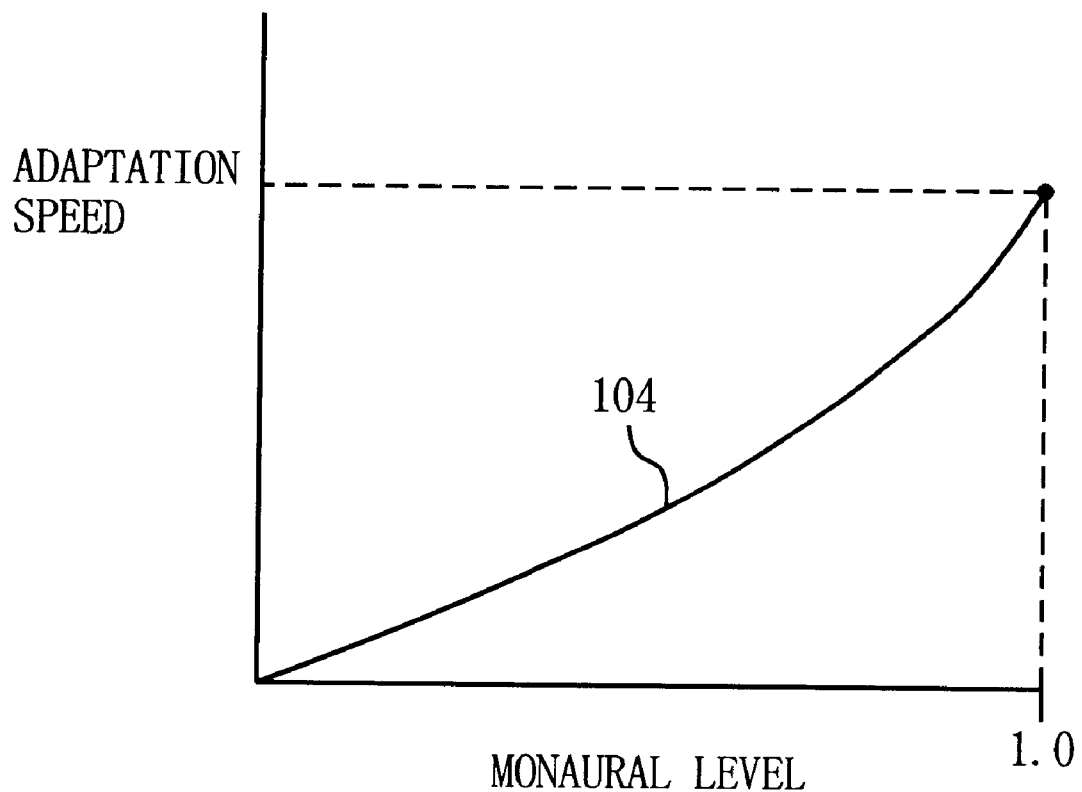
FIG. 19 is a diagram showing characteristics of an adaptation speed control process performed by an adaptation control part 1672 of FIG. 18.

FIG. 19 is a diagram showing characteristics of an adaptation speed control process performed by the adaptation control part 1672 of FIG. 18. In FIG. 19, a characteristic curve 104 indicates a relation between the monaural level of the stereo signals to the loudspeakers 9a and 9b of FIG. 18 and the adaptation speed of the echo canceller 163.

As is known from FIG. 19, if the stereo signals are high in monaural level and determined to be suitable for adaptation, the adaptation control part 1672 increases the adaptation speed so as to always obtain the optimum estimated impulse response. On the other hand, if these signals are low in monaural level and determined not to be suitable for adaptation, the adaptation control part 1672 reduces the adaptation speed so as to prevent the estimated impulse response from being damaged.

As described above, according to the present embodiment, the adaptation speed of the adaptive digital filter 163a is controlled based on the monaural level of the 2-channel signals (stereo signals). Therefore, appropriate echo cancellation can be made for 2-channel signals with varying monaural levels.

That is, if the monaural level is low, the adaptation speed is reduced and thereby noise resistance is increased. On the other hand, if the monaural level is high, stereo components as noise are small in quantity for the adaptive digital filter 163a. Therefore, the adaptation speed is increased and thereby fluctuations in impulse response on the echo path can be followed more. Consequently, an excellent echo canceling effect can be achieved especially with a high monaural level, and speech recognition performance immediately after the transition to an active state is increased.

Eleventh Embodiment

Figure 20:
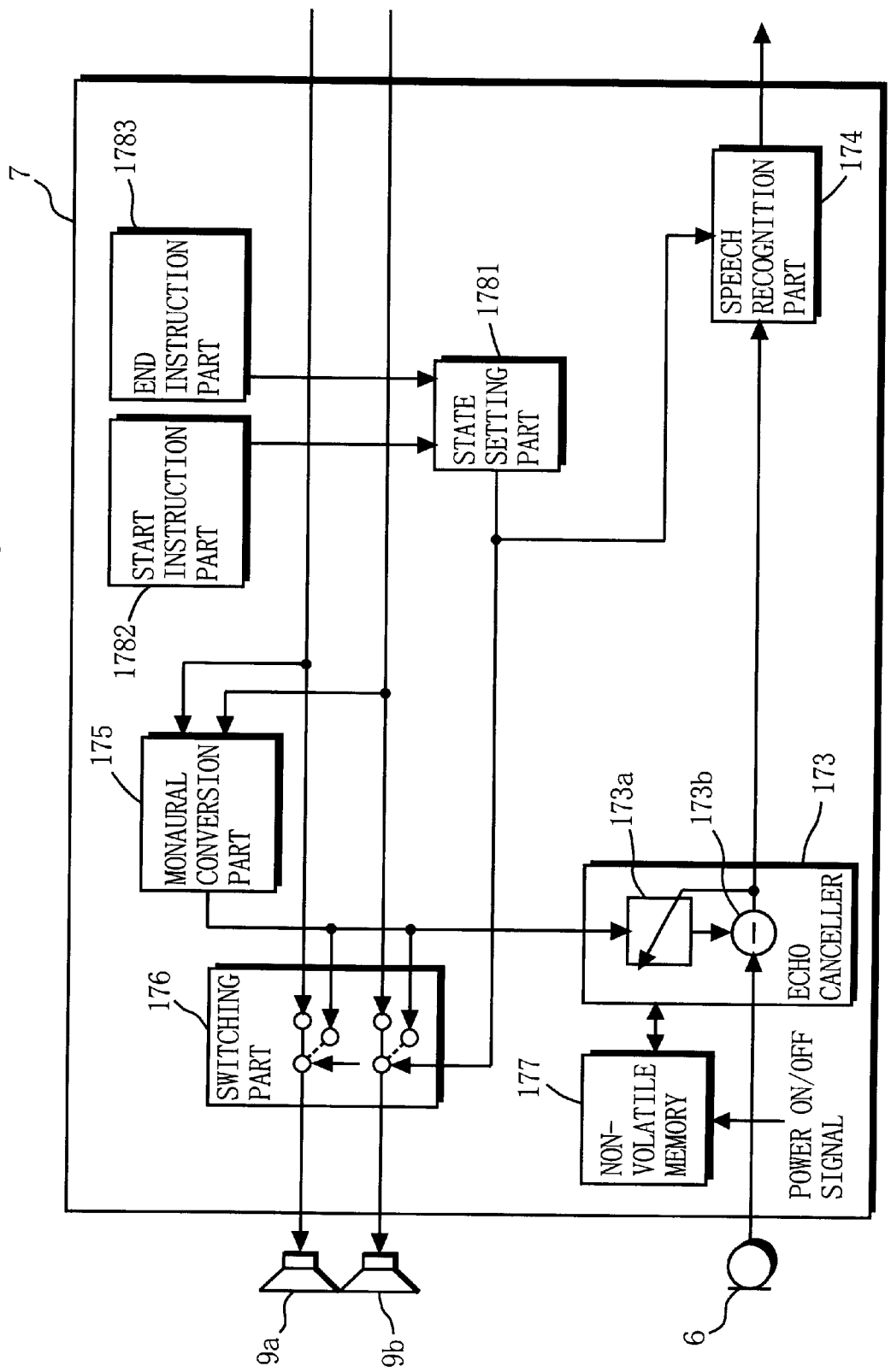
FIG. 20 is a block diagram showing the structure of a speech recognition apparatus for AV equipment according to an eleventh embodiment of the present invention.

FIG. 20 is a block diagram showing the structure of a speech recognition apparatus for AV equipment according to an eleventh embodiment of the present invention. In FIG. 20, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 20, the speech recognition apparatus 7 includes a monaural conversion part 175, a single echo canceller 173, a speech recognition part 174, a start instruction part 1782, an end instruction part 1783, a state setting part 1781, a switching part 176, and non-volatile memory 177. That is, the speech recognition apparatus 7 of FIG. 20 equals in structure to the speech recognition apparatus 7 of FIG. 7 (third embodiment) with the non-volatile memory 177 added thereto. The signals provided to the loudspeakers 9a and 9b are 2-channel signals outputted from the AV processor 3 of FIG. 1.

The non-volatile memory 177 is provided with a power ON/OFF signal from the control panel 5 of FIG. 1. When the power is OFF, the non-volatile memory 177 obtains the estimated impulse response held in the echo canceller 173 and then stores it therein. When the power is ON, the non-volatile memory 177 provides the stored estimated impulse response to an adaptive digital filter 173a in the echo canceller 173.

To start echo cancellation, the echo canceller 173 uses the estimated impulse response provided by the non-volatile memory 177 as an initial value. That is, the adaptive digital filter 173a starts estimation of the impulse response using the value provided by the non-volatile memory 177 as the initial value.

The echo canceller 173 carries out operation similar to that of the echo canceller 54 of FIG. 7 except that the initial values used at power ON differ. The echo canceller 54 uses 0 as the initial value in order to start echo cancellation. Therefore, echo sound is not sufficiently cancelled out during a period from the time immediately after power ON to the time when the digital filter 54a is being adapted.

The operations of the components other than the nonvolatile 177 and the echo canceller 173 are similar to those in the third embodiment. Therefore, their description is omitted herein.

The hardware structure of the speech recognition apparatus 7 of FIG. 20 is similar to that of FIG. 3 with the non-volatile memory 177 added thereto. A predetermined program is previously stored in the ROM 12. In addition to the algorithms (a) to (c) as stated in the first embodiment, the algorithm (e) as stated in the second embodiment, and the algorithm (f) as stated in the third embodiment, further written in the program is (n) procedure for writing the estimated impulse response held by the echo canceller 173 in the non-volatile memory 177 when power is OFF and providing the estimated impulse response to the echo canceller 173 when power is ON. The CPU 10 operates according to the above program while using the RAM 11 as a work area. With such structure, the function of each block shown in FIG. 20 is achieved.

Note that the start instruction part 1782 and the end instruction part 1783 are implemented as the buttons composing the control panel of FIG. 1. Moreover, the function of each block other than the start instruction part 1782 and the end instruction part 1783 can also be achieved by each dedicated piece of hardware instead of software.

The operation of the above-structured speech recognition apparatus for AV equipment 7 is now described below.

The impulse response on a echo path between the loudspeakers 9a and 9b and the microphone 6 depends on the state of sound reflection on walls, ceilings, floors, furniture, persons, windows, curtains, etc. Even for the same AV equipment, its impulse response varies widely depending on the surroundings of its location. Furthermore, the impulse response also varies with time due to movement of the AV equipment, movement of the furniture, comings and goings of persons, opening and closing of windows, etc. Therefore, a sufficient echo canceling effect cannot be achieved with a fixed impulse response. For this reason, the echo canceller 173 of the speech recognition apparatus 7 of FIG. 7 performs sequential adaptation, always estimating the latest impulse response. However, in such adaptation method taking 0 as the initial value of the impulse response, sufficient echo cancellation cannot be achieved immediately after power ON.

If detailed factors such as persons and windows are not considered, the impulse response roughly determined by the installation place of the AV equipment, the outline of the room, etc. will not change in one or two days unless the furniture layout of the room is changed. If the estimated impulse response used at power OFF yesterday is used at power ON today, echo cancellation can often be achieved to a certain degree.

Therefore, in the speech recognition apparatus 7 of FIG. 20, the non-volatile memory 177 is provided. In the non-volatile memory 177, the estimated impulse response held at power OFF by the echo canceller 173 is stored. At power ON, this estimated impulse response stored in the non-volatile memory 177 is used as the initial value for starting the echo canceller 173.

As stated above, according to the present embodiment, the estimated impulse response at power OFF is stored, and used at power ON as the initial value for starting estimation of the impulse response. Therefore, compared with the case where 0 is used as the initial value, the estimation error immediately after the power is ON is reduced, thereby increasing speech recognition performance.

Twelfth Embodiment

Figure 21:
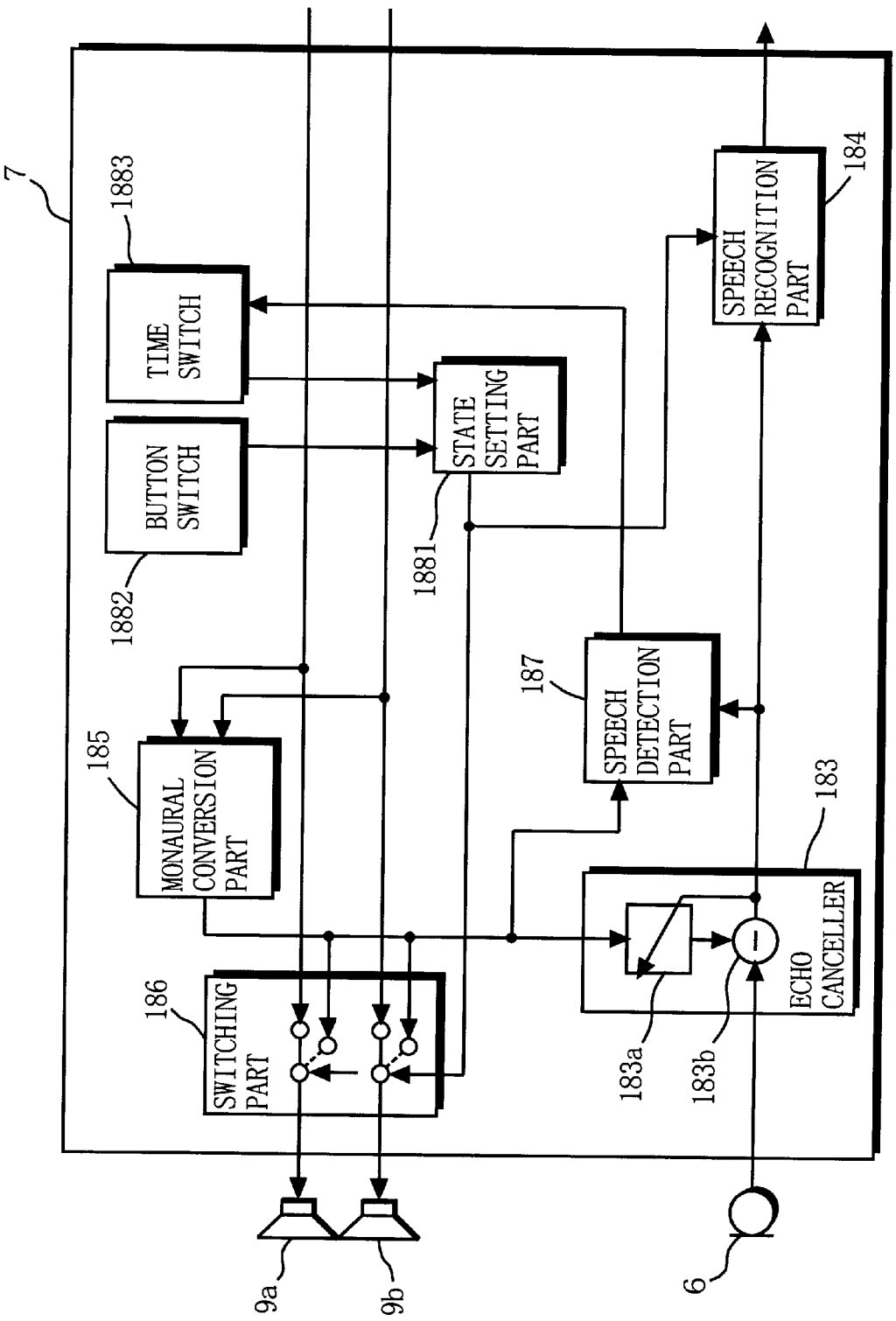
FIG. 21 is a block diagram showing the structure of a speech recognition apparatus for AV equipment according to a twelfth embodiment of the present invention.

FIG. 21 is a block diagram showing the structure of a speech recognition apparatus for AV equipment according to a twelfth embodiment of the present invention. In FIG. 21, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 21, the speech recognition apparatus 7 includes a monaural conversion part 185, a single echo canceller 183, a speech recognition part 184, a speech detection part 187, a button switch 1882 as a start instruction part, a time switch 1883 as an end instruction part, a state setting part 1881, and a switching part 186. That is, the speech recognition apparatus 7 of FIG. 21 equals in structure to the speech recognition apparatus 7 of FIG. 7 (third embodiment) with the speech detection part 187 added thereto, and further with the button switch 1882 instead of the start instruction part 581 and the time switch 1883 instead of the end instruction part 582 provided thereto. The speech detection part 187 equals to the speech detection part 37 of FIG. 5 (refer to the second embodiment). The signals provided to the loudspeakers 9a and 9b are 2-channel signals outputted from the AV processor 3 of FIG. 1.

When pressed, the button switch 1882 sends a signal for instructing a start of the speech recognition operation to the state setting part 1881. The speech detection part 187 detects the presence or absence of user's speech, and reports the detection result to the time switch 1883. The time switch 1883 starts clock operation at the instant of transition from the presence to absence of the user's speech. After a predetermined time has elapsed from the start of clock operation, the time switch 1883 sends a signal for instructing an end of the speech recognition operation to the state setting part 1881.

Responsive to the instruction signal from the button switch 1882 or the time switch 1883, the state setting part 1881 sets the state of operation of the speech recognition part 184 (i.e., set speech recognition operation ON/OFF).

The operations of the components other than the speech detection part 187, the button switch 1882, the time switch 1883, and the state setting part 1881 are similar to those in the third embodiment. Therefore, their description is omitted herein.

The hardware structure of the speech recognition apparatus 7 of FIG. 21 is similar to that of FIG. 3 with the non-volatile memory 177 added thereto. In FIG. 3, a predetermined program is previously stored in the ROM 12. In addition to the algorithms (a) to (c) as stated in the first embodiment, the algorithm (e) as stated in the second embodiment, and the algorithm (f) as stated in the third embodiment, further written in the program is (o) procedure for carry out clock operation and sending an end instruction signal after a predetermined time has elapsed from the start of clock operation. The CPU 10 operates according to the above program while using the RAM 11 as a work area. With such structure, the function of each block shown in FIG. 21 is achieved.

Note that the button switch 1882 is implemented by any of the buttons composing the control panel of FIG. 1. Moreover, the function of each block other than the button switch 1882 can also be achieved by each dedicated piece of hardware instead of software.

The operation of the above-structured speech recognition apparatus for AV equipment 7 is now described below.

In the present embodiment, specific examples of the start instruction part 581 and the end instruction part 582 in the speech recognition apparatus 7 of FIG. 7 are shown. To utilize the speech recognition function, the user first presses the button switch 1882 that corresponds to the start instruction part 581 of FIG. 7. The n, the state setting part 1881 is instructed to switch from a wait state (OFF state of the speech recognition operation) to an active state (ON state). At the same time, the time switch 1883 is instructed to start clock operation.

In the active state, the speech detection part 187 checks whether the user's speech is inputted or not. If speech is detected, the time switch 1883 resets a measurement time to 0. When the measurement time of the time switch 1883 becomes larger than a predetermined value after no speech is detected for awhile, the time switch 1883 instructs the state setting part 1881 to switch from an active to wait state.

As stated above, according to the present embodiment, the speech recognition function can be automatically ended.

Thirteenth Embodiment

Figure 22:
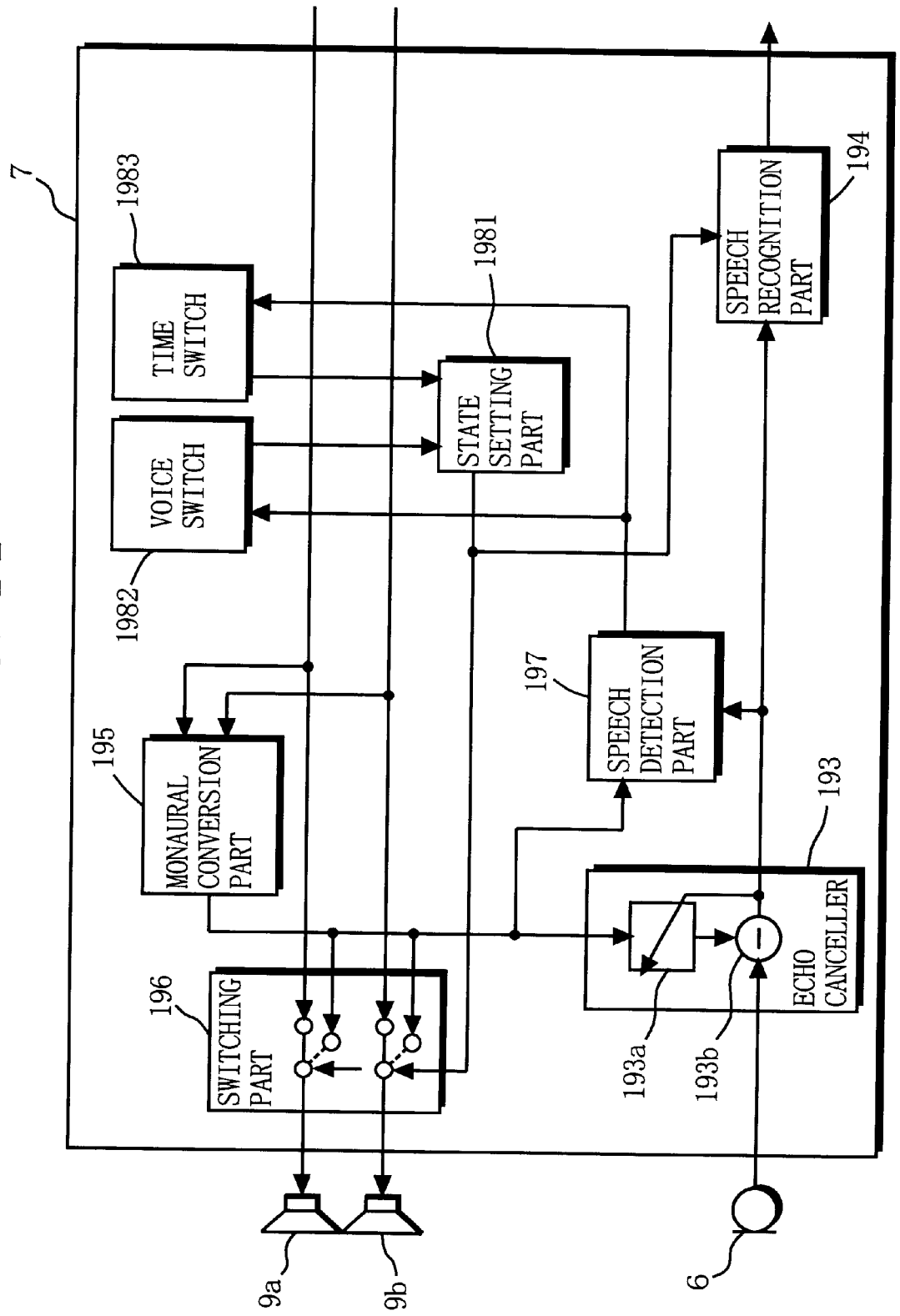
FIG. 22 is a block diagram showing the structure of a speech recognition apparatus for AV equipment according to a thirteenth embodiment of the present invention.
Figure 23:
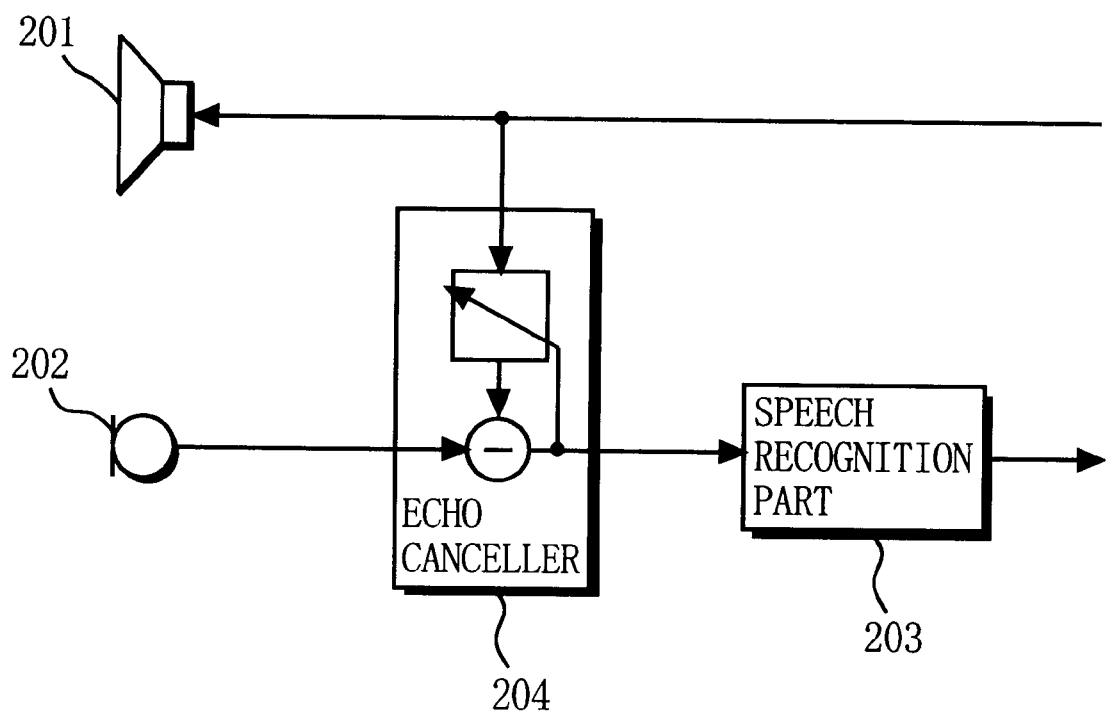
FIG. 23 is a block diagram showing the structure of a conventional speech recognition apparatus for AV equipment.
Figure 24:
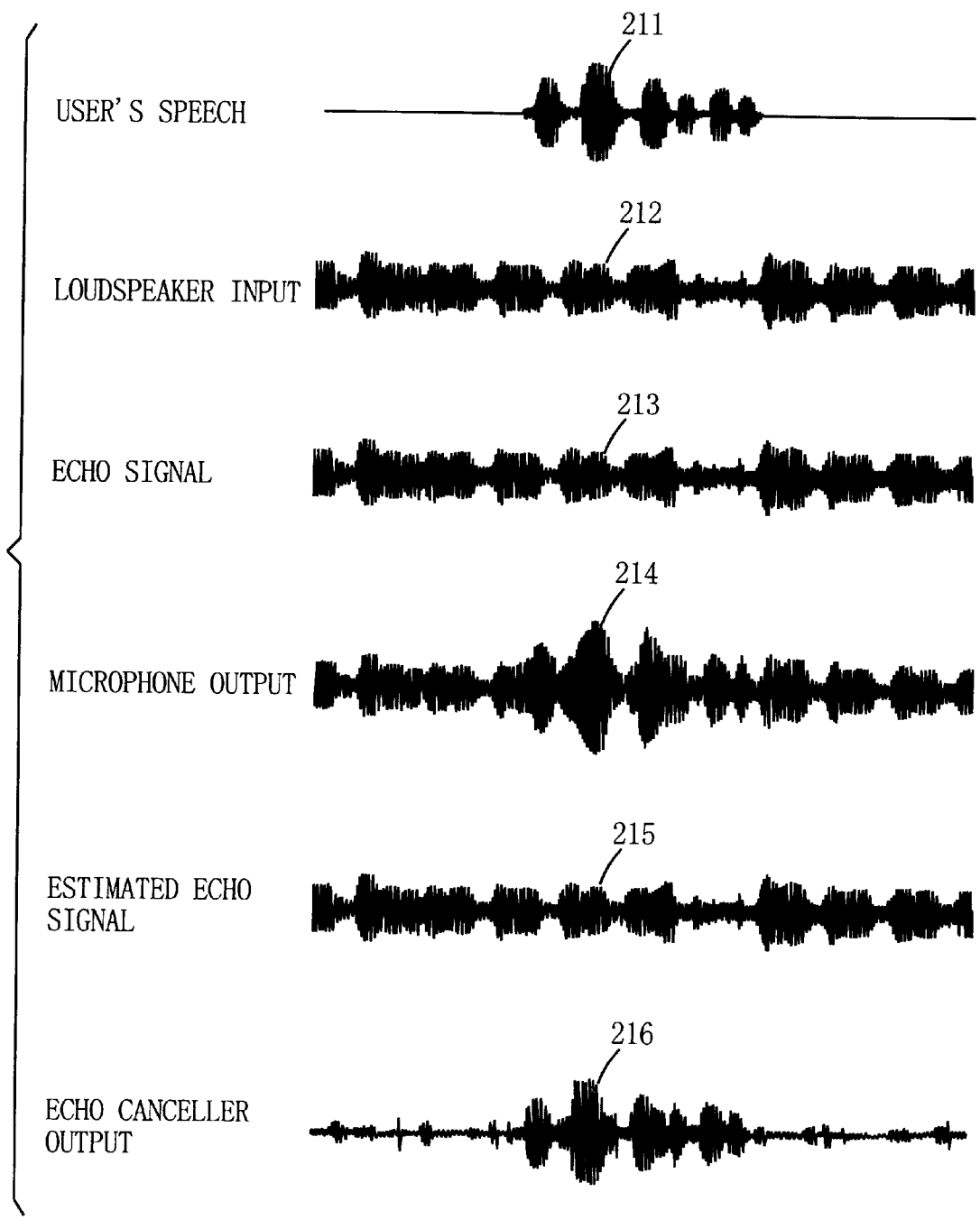
FIG. 24 is a diagram showing time waveforms of signals inputted to or outputted from components in the speech recognition apparatus of FIG. 23.
Figure 25:
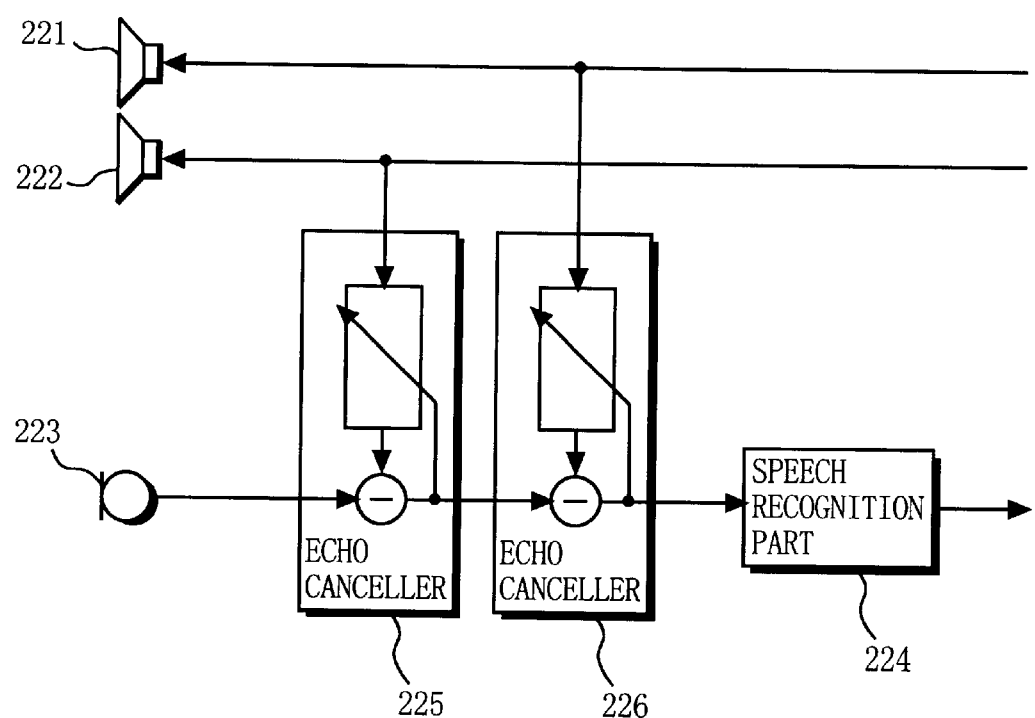
FIG. 25 is a block diagram showing the structure of another conventional speech recognition apparatus for AV equipment.

FIG. 22 is a block diagram showing the structure of a speech recognition apparatus for AV equipment according to a thirteenth embodiment of the present invention. In FIG. 22, components corresponding to those in FIG. 1 are provided with the same reference numerals. In the present embodiment, however, assume that, in the AV equipment, 2-channel signals are outputted from the AV processor 3 and 2-channel sound is produced through two loudspeakers 9a and 9b included in the loudspeaker unit 9.

In FIG. 22, the speech recognition apparatus 7 includes a monaural conversion part 195, a single echo canceller 193, a speech recognition part 194, a speech detection part 197, a voice switch 1982 as a start instruction part, a time switch 1983 as an end instruction part, a state setting part 1981, and a switching part 196. That is, the speech recognition apparatus 7 of FIG. 22 equals in structure to the speech recognition apparatus 7 of FIG. 7 (third embodiment) with the speech detection part 197 added thereto, and further with the voice switch 1982 instead of the start instruction part 581 and the time switch 1983 instead of the end instruction part 582. The speech detection part 197 equals to the speech detection part 37 of FIG. 5 (refer to the second embodiment). The signals provided to the loudspeakers 9a and 9b are 2-channel signals outputted from the AV processor 3 of FIG. 1.

The speech detection part 197 detects the presence or absence of user's speech, and reports the detection result to the voice switch 1982 and the time switch 1983. At the instant of transition from the absence to presence of the user's speech, the voice switch 1982 sends a signal for starting the speech recognition operation to the state setting part 1981. The time switch 1983 starts clock operation at the instant of transition from the presence to absence of the user's speech. Then, after a predetermined time has elapsed from the start of clock operation, the time switch 1983 sends a signal for instructing an end of the speech recognition operation to the state setting part 1981.

Responsive to the instruction signal from the voice switch 1982 or the time switch 1983, the state setting part 1981 sets the state of operation of the speech recognition part 194 (i.e., set speech recognition operation ON/OFF).

The operations of the components other than the speech detection part 197, the voice switch 1982, the time switch 1983, and the state setting part 1981 are similar to those in the third embodiment. Therefore, their description is omitted herein.

The hardware structure of the speech recognition apparatus 7 of FIG. 22 is similar to that of FIG. 3 with the non-volatile memory 177 added thereto. In FIG. 3, a predetermined program is previously stored in the ROM 12. In addition to the algorithms (a) to (c) as stated in the first embodiment, the algorithm (e) as stated in the second embodiment, the algorithm (f) as stated in the third embodiment, and the procedure (o) as stated in the twelfth embodiment, further written in the program is (p) procedure for sending a start instruction signal at detection of speech. The CPU 10 operates according to the above program while using the RAM 11 as a work area. With such structure, the function of each block shown in FIG. 22 is achieved.

Note that the function of each block can also be achieved by each dedicated piece of hardware instead of software.

The operation of the above-structured speech recognition apparatus for AV equipment 7 is now described below.

In the speech recognition apparatus 7 of FIG. 22, the speech detection part 197 always attempts to detect user's speech even in the wait state. To utilize the speech recognition function, the user speaks rather loudly. The speech detector 197 detects the user's speech, and sends the detection result to the voice switch 1982. If the speech at a predetermined level or more is detected, the voice switch 1982 sends an instruction for starting speech recognition to the state setting part 1981, instructing the same to switch from a wait to active state.

The detection result by the speech detection part 197 is also sent to the time switch 1983. In response thereto, the time switch starts time measurement. In the active state, the speech detection part 197 checks whether the user's speech is inputted or not. If speech is detected, the time switch 1983 resets a measurement time to 0. When the measurement time of the time switch 1883 becomes larger than a predetermined value after no speech is detected for a while, the time switch 1983 instructs the state setting part 1981 to switch from an active to wait state.

The level at which the voice switch 1982 is turned ON is set considerably higher than the speech level at which the time switch 1983 is reset. This setting is made in order to prevent erroneous detection of residual echo sound at a relatively high level that occurs in the wait state where the echo cancelller 193 cannot perform sufficient cancellation, and, accordingly, erroneous transition to an active mode.

While the invention has been described in detail, the foregoing description is in all aspects illustrative and not restrictive. It is understood that numerous other modifications and variations can be devised without departing from the scope of the invention.

What is claimed is:

1. A speech recognition apparatus used for AV equipment and operable for outputting multichannel sound through a plurality of loudspeakers, recognizing a user's speech inputted through a microphone, and causing the AV equipment to perform a predetermined process, said apparatus comprising:

a monaural conversion part for converting multichannel signals transmitted to the plurality of loudspeakers into a monaural signal;

a single echo canceller, provided with an output from the microphone (microphone output) and an output from said monaural conversion part (monaural output), for estimating echo sound of the multichannel sound based on the monaural signal and eliminating the echo sound from the microphone output;

a speech recognition part for recognizing the user's speech based on an output from said single echo canceller (echo canceller output);

a switching part for switching between the multichannel signals and the monaural signal transmitted to the plurality of loudspeakers; and a speech detection part for detecting the user's speech based on the monaural signal and said echo canceller output;

wherein said switching part:
inputs the multichannel signals to the plurality of loudspeakers when said speech detection part does not detect the user's speech; and
inputs the monaural signal to the plurality of loudspeakers when said speech detection part detects the user's speech.

2. A speech recognition apparatus used for AV equipment and operable for outputting multichannel sound through a plurality of loudspeakers, recognizing a user's speech inputted through a microphone, and causing the AV equipment to perform a predetermined process, said apparatus comprising:

a monaural conversion part for converting multichannel signals transmitted to the plurality of loudspeakers into a monaural signal;

a single echo canceller, provided with an output from the microphone (microphone output) and an output from said monaural conversion part (monaural output), for estimating echo sound of the multichannel sound based on the monaural signal and eliminating the echo sound from the microphone output;

a speech recognition part for recognizing the user's speech based on an output from said single echo canceller (echo canceller output);

a switching part for switching between the multichannel signals and the monaural signal transmitted to the plurality of loudspeakers;

a start instruction part for providing an instruction to start speech recognition operation;

an end instruction part for providing an instruction to end the speech recognition operation; and a state setting part for setting, responsive to the instructions from said start instruction part and said end instruction part, said speech recognition part to an active state or wait state;

wherein said switching part:
inputs the multichannel signals to the plurality of loudspeakers when said state setting part sets said speech recognition part to the wait state; and
inputs the monaural signal to the plurality of loudspeakers when said state setting part sets said speech recognition part to the active state.

3. The speech recognition apparatus for the AV equipment according to claim 2, further comprising:

a monaural level determination part for determining a monaural level of the multichannel signals; and an arbitrary level monaural conversion part for converting the multichannel signals at an arbitrary monaural level;

wherein said monaural conversion part completely converts the multichannel signals; and wherein when the monaural level determined by said monaural level determination part is lower than a predetermined monaural level, said arbitrary level monaural conversion part converts the multichannel signals at the predetermined monaural level.

4. The speech recognition apparatus for the AV equipment according to claim 2, wherein:

the multichannel signals are signals of three or more channels;

said speech recognition apparatus further comprises a 2-channel conversion part for converting the multichannel signals into 2-channel signals;

said monaural conversion part converts the 2-channel signals into a monaural signal; and said switching part switches among the multichannel signals, the 2-channel signals, and the monaural signal for output to the plurality of loudspeakers.

5. The speech recognition apparatus for the AV equipment according to claim 4, further comprising:

a speech detection part for detecting the user's speech based on the monaural signal and the echo canceller output;

wherein said switching part:
inputs the multichannel signals to the plurality of loudspeakers when said state setting part sets said speech recognition part to the wait state;
inputs the 2-channel signals to the plurality of loudspeakers when said state setting part sets said speech recognition part to the active state; and
inputs the monaural signal to the plurality of loudspeakers when said speech detection part detects the user's speech.

6. The speech recognition apparatus for the AV equipment according to claim 2, further comprising:

a cancellation monitoring part for monitoring, based on the monaural signal and the echo canceller output, whether said echo canceller sufficiently cancels out the echo sound;

a speech detection part for detecting the user's speech based on the monaural signal and the echo canceller output; and an attenuation part for attenuating the multichannel signals;

wherein said attenuation part attenuates the multichannel signals when said speech detection part detects the user's speech while said cancellation monitoring part indicates that the echo sound is not sufficiently cancelled out.

7. The speech recognition apparatus for the AV equipment according to claim 2, wherein:

said echo canceller comprises:
an adaptive digital filter for estimating an impulse response on an echo path between the plurality of loudspeakers and the microphone and calculating the echo sound based on the estimated impulse response and the monaural signal; and
a subtractor for subtracting an output from said adaptive digital filter from said microphone output.

8. The speech recognition apparatus for the AV equipment according to claim 7, further comprising:

an adaptation sound generator for generating monaural adaptation sound for accelerating adaptation of said adaptive digital filter when said switching part switches inputs to the plurality of loudspeakers from the multichannel signals to the monaural signal.

9. The speech recognition apparatus for the AV equipment according to claim 7, further comprising:

an adaptation control part for controlling an adaptation speed of said adaptive digital filter;

wherein said adaptation control part includes a high adaptation speed for monaural and a low adaptation speed for multichannel, selecting the high adaptation speed when said state setting part sets said speech recognition part to the active state and selecting the low adaptation speed when said state setting part sets said speech recognition part to the wait state.

10. The speech recognition apparatus for the AV equipment according to claim 9, wherein:

said adaptation control part is provided with an identification signal indicating whether the plurality of loudspeakers are provided with the multichannel signals or the monaural signal; and when the identification signal indicates monaural, said adaptation control part selects the high adaptation speed irrespectively of whether said state setting part sets said speech recognition part to the active or wait state.

11. The speech recognition apparatus for the AV equipment according to claim 7, further comprising:

a monaural level determination part for determining a monaural level of the multichannel signals; and an adaptation control part for controlling the adaptation speed of said adaptive digital filter based on the determined monaural level.

12. The speech recognition apparatus for the AV equipment according to claim 11, wherein said adaptation control part increases the adaptation speed of said adaptive digital filter as the monaural level of the multichannel signals is higher.

13. The speech recognition apparatus for the AV equipment according to claim 7, further comprising:

a non-volatile memory, wherein said non-volatile memory:

receives and stores the impulse response estimated by said adaptive digital filter at power OFF; and provides, at power ON, the estimated impulse response stored at power OFF to said adaptive digital filter; and wherein said adaptive digital filter starts estimating the impulse response by taking the estimated impulse response provided at power OFF by said non-volatile memory as an initial value.

14. The speech recognition apparatus for the AV equipment according to claim 2, further comprising:

a speech detection part for detecting the user's speech based on the monaural signal and the echo canceller output;

wherein said start instruction part is implemented by a button switch that provides a start instruction to said state setting part when being pressed; and wherein said end instruction part is implemented by a time switch that provides an end instruction to said state setting part after a predetermined period during which said speech detection part is not detecting the user's speech.

15. The speech recognition apparatus for the AV equipment according to claim 2, further comprising:

a speech detection part for detecting the user's speech based on the monaural signal and the echo canceller output;

wherein said start instruction part is implemented by a voice switch that provides a start instruction to said state setting part when said speech detection part detects the user's speech; and wherein said end instruction part is implemented by a time switch that provides an end instruction to said state setting part after a predetermined period during which said speech detection part is not detecting the user's speech.

* * * * *